(12) United States Patent  
Tardif

(10) Patent No.: US 12,517,052 B2  
(45) Date of Patent: Jan. 6, 2026

(54) SYSTEMS AND METHODS FOR OPTOGENETIC ACTIVATION AND MONITORING

(71) Applicant: INSTITUT NATIONAL D'OPTIQUE, Quebec (CA)

(72) Inventor: Christian Tardif, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 980 days.

(21) Appl. No.: 17/632,835

(22) PCT Filed: Jul. 24, 2020

(86) PCT No.: PCT/CA2020/051020  
§ 371 (c)(1),  
(2) Date: Feb. 4, 2022

(87) PCT Pub. No.: WO2021/022360  
PCT Pub. Date: Feb. 11, 2021

(65) Prior Publication Data  
US 2022/0268702 A1    Aug. 25, 2022

Related U.S. Application Data

(60) Provisional application No. 62/884,344, filed on Aug. 8, 2019.

(51) Int. Cl.  
    *G01N 21/64*      (2006.01)  
    *G01N 33/50*      (2006.01)

(52) U.S. Cl.  
    CPC ..... *G01N 21/6458* (2013.01); *G01N 33/5023* (2013.01); *G01N 33/5035* (2013.01);  
(Continued)

(58) Field of Classification Search  
None  
See application file for complete search history.

(56) References Cited

U.S. PATENT DOCUMENTS

| | | |
|---|---|---|
| 6,399,935 B1 | 6/2002 | Jovin et al. |
| 6,885,492 B2 | 4/2005 | DeSimone et al. |

(Continued)

OTHER PUBLICATIONS

De Vries, AHB, et al., "Generation 3 programmable array microscope (PAM) for high speed large format optical sectioning in fluorescence", Proc. SPIE 9376, Emerging Digital Micromirror Device Based Systems and Applications VII, 93760C (Mar. 10, 2015).

(Continued)

*Primary Examiner* — Matthew D Krcha  
(74) *Attorney, Agent, or Firm* — KDW FIRM PLLC

(57) ABSTRACT

Optogenetic systems and methods for probing a specimen using spatio-temporally modulated illumination light are disclosed. A method may include generating illumination light, the illumination light including a plurality of illumination protocols temporally sampled and interleaved with one another at a time-division-multiplexed (TDM) sampling rate, each illumination protocol being for illuminating a respective region of interest (ROI) of a plurality of ROIs of the specimen. The illumination light may include either activation or excitation light, or both. The method may also include applying a spatio-temporal modulation to the illumination light and directing the resulting modulated illumination light onto the specimen. The modulation may include repeatedly imparting, at a pattern switching rate matched and synchronized with the TDM sampling rate, a sequence of a plurality of spatial modulation patterns to the plurality of temporally sampled and interleaved illumination protocols, each spatial modulation pattern mapping to a respective one of the ROIs.

19 Claims, 10 Drawing Sheets

(52) U.S. Cl.
CPC ............... *G01N 2201/0691* (2013.01); *G01N 2333/705* (2013.01)

(56) References Cited

U.S. PATENT DOCUMENTS

| | | |
|---|---|---|
| 7,525,727 B2 | 4/2009 | Sander |
| 7,706,584 B2 | 4/2010 | Saggau et al. |
| 9,535,242 B1 | 1/2017 | Acosta et al. |
| 9,829,690 B2 | 11/2017 | Kang |
| 10,288,863 B2 | 5/2019 | Werley et al. |
| 2017/0176338 A1* | 6/2017 | Wu .................... G01N 21/6428 |
| 2018/0177401 A1* | 6/2018 | Yang .................. G01N 21/6458 |

OTHER PUBLICATIONS

Heintzmann R, et al., "A dual path programmable array microscope (PAM): simultaneous acquisition of conjugate and hon-conjugate images", J Microsc. 204(Pt 2):119-35 (2001).
International Search Report and Written Opinion for International application No. PCT/CA2020/051020, mailed Oct. 28, 2020, 6 pages.
Lin, M., and Schnitzer, M., "Genetically encoded indicators of neuronal activity", Nat Neurosci 19(9):1142-1153 (2016).
Canadian Examination Report in Canadian Application No. 3146259 dated Apr. 4, 2025, 3 pages.

* cited by examiner

Excitation time profiles of excitation protocols

Sampling of excitation protocols

Interleaving of sampled excitation protocols

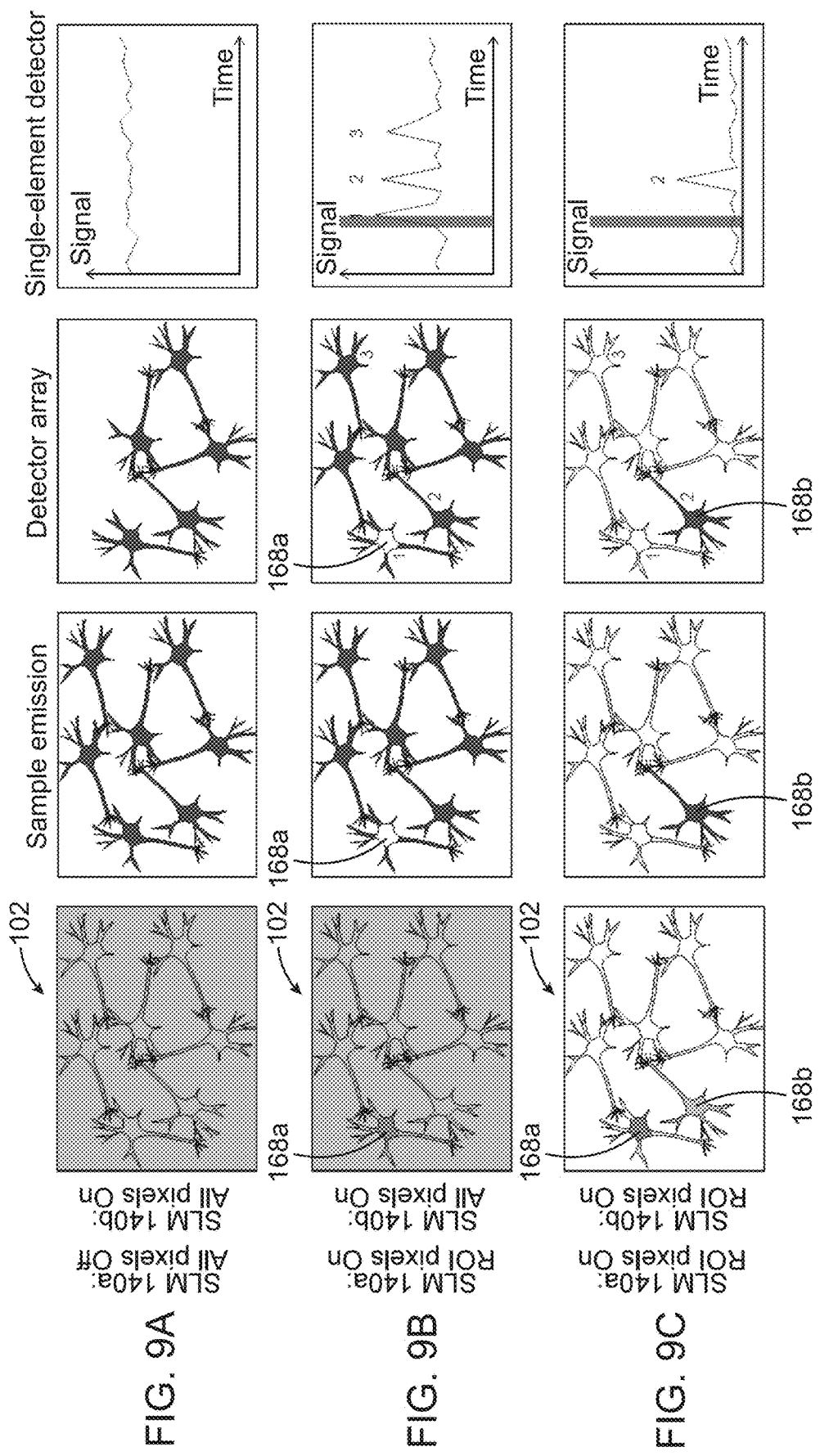

SYSTEMS AND METHODS FOR OPTOGENETIC ACTIVATION AND MONITORING

CROSS-REFERENCE TO RELATED APPLICATIONS

The present application is a national stage application under 35 U.S.C. § 371 of International Application No. PCT/CA2020/051020, filed Jul. 24, 2020, and which claims priority to U.S. Provisional Patent Application No. 62/884,344 filed on Aug. 8, 2019. The contents of the above-referenced patent applications are incorporated herein by reference in their entirety

TECHNICAL FIELD

The technical field generally relates to optogenetics and, more particularly, to systems and methods for optogenetic activation and monitoring.

BACKGROUND

Brain functions, such as cognition, learning, memory, behavior, and physical action, are controlled and regulated by cellular excitability. The understanding and control of processes and mechanisms involved in cellular excitability have been the subject of current research in many fields of medicine and biotechnology, for example, in the area of neurological disorders and diseases. Cellular excitability can be studied using a variety of techniques, among which is optogenetics. Optogenetics is a branch of biotechnology that combines optical methods with genetic targeting tools to achieve precise spatio-temporal control and monitoring of cell activity. Optogenetics generally uses two main classes of tools: actuators and reporters, which respectively enable light-mediated control and monitoring of cell activity.

Optogenetic actuators are typically genetically encoded light-sensitive proteins that can change their conformation upon exposure to light of specific wavelength. The activation of optogenetic actuators can cause ion channel gating or pump activation, cell depolarization or hyperpolarization, and ultimately cellular stimulation or inhibition in cells, frequently neurons, in which the actuators are expressed. Common optogenetic actuators are opsins, which are naturally occurring transmembrane proteins that can act as ion channels or pumps. Opsins include both stimulatory opsins, such as Channelrhodopsin-2 (ChR2), and inhibitory opsins, such as *Natronomonas pharaonis* Halorhodopsin (N pH R).

Optogenetic reporters, also referred to as optogenetic indicators, are typically genetically encoded fluorescent proteins whose emission characteristics vary in response to physical and biochemical changes within cells. Optogenetic reporters can be probed using fluorescence microscopy to enable sensing, monitoring, and/or imaging of biological structures, parameters, and processes. By way of example, fluorescence microscopy can be used to track the spatial distribution of optogenetic reporters within cells; sense biological parameters, such as ion concentrations and membrane potentials; monitor or detect phenomena, such as cell surface binding or neurotransmitter release; and study cellular activity, notably cellular excitability, in neurons and myocytes. In particular, fluorescent reporters whose emission characteristics are modulated as a function of changes in ionic concentrations (e.g., calcium reporters, whose fluorescence varies in response to changes in intracellular calcium concentration) or as a function of changes in membrane potential (e.g., voltage reporters, whose fluorescence varies in response to transmembrane ion exchanges between the intra- and extra-cellular matrices) can allow for monitoring cellular excitability.

While existing optogenetic techniques for controlling and monitoring cellular excitability may have certain advantages, they also have a number of drawbacks and limitations. For example, since membrane potential variations are relatively fast (e.g., of the order of 1 kilohertz), conventional pixel-based cameras often struggle to measure the fluorescence signals from voltage reporters. This may be a reason why calcium reporters, whose response times are significantly slower (e.g., of the order of 30 hertz), have been favored up to now for use as optogenetic reporters. In addition, measurements of cell excitability can involve activating optogenetic actuators present in one or more regions of a specimen while simultaneously monitoring optogenetic reporters in other regions of the specimen. A number of microscopy modalities have been developed or adapted for this purpose. Non-limiting examples include random access microscopy based on acousto-optic deflectors (AODs) and laser scanning microscopy, such as confocal laser scanning microscopy (CLSM) and programmable array microscopy (PAM). However, these modalities still suffer from a number of drawbacks and limitations, such as high cost, single-wavelength operation, and cameras with relatively slow acquisition rates. Thus, challenges remain in the field of optogenetic systems and methods for controlling and monitoring cell activity.

SUMMARY

The present description generally relates to optogenetic systems and methods for probing a specimen using spatio-temporally modulated illumination. The disclosed systems and methods may provide high-throughput, space- and time-resolved, and/or cell-type-specific control and monitoring of cellular activity. The disclosed systems and methods may be implemented with or in various types of microscopy modalities including, but not limited to, widefield microscopy, confocal microscopy, and other types of fluorescence-based microscopy.

In accordance with an aspect, there is provided an optogenetic method for probing a specimen, including:
  generating illumination light, the illumination light including a plurality of illumination protocols temporally sampled and interleaved with one another at a time-division-multiplexed (TDM) sampling rate, each illumination protocol being for illuminating a respective region of interest (ROI) of a plurality of ROIs of the specimen; and
  applying a spatio-temporal modulation to the illumination light to produce modulated illumination light and directing the modulated illumination light onto the specimen, the spatio-temporal modulation including repeatedly imparting, at a pattern switching rate matched and synchronized with the TDM sampling rate, a sequence of a plurality of spatial modulation patterns to the plurality of temporally sampled and interleaved illumination protocols, each spatial modulation pattern mapping to a respective one of the ROIs.

In some implementations, the plurality of illumination protocols is a plurality of activation protocols for activating optical actuators present in the plurality of ROIs, respectively.

In some implementations, the plurality of illumination protocols is a plurality of excitation protocols for exciting optical reporters present in the plurality of ROIs, respectively. In such implementations, the method further includes detecting specimen light coming from the optical reporters present in the plurality of ROIs in response to the plurality of excitation protocols, generating, from the detected specimen light, detection signal data conveying information about the specimen. The specimen light may include fluorescence light. In some implementations, detecting the specimen light includes detecting a plurality of time-interleaved detection signals respectively associated with the plurality of ROIs, and generating the detection signal data includes performing a time-demultiplexing operation on the detected specimen light for deinterleaving the plurality of time-interleaved detection signals. In some implementations, the method may further include repeatedly imparting, at the pattern switching rate, the sequence of the plurality of spatial modulation patterns to the specimen light prior to detecting the specimen light.

In some implementations, generating the illumination light further includes generating a plurality of activation protocols temporally sampled and interleaved with one another at the TDM sampling rate, the plurality of activation protocols being for activating optical actuators present in the plurality of ROIs, and applying the spatio-temporal modulation to the illumination light further includes repeatedly imparting, at the pattern switching rate, the sequence of the plurality of spatial modulation patterns to the plurality of temporally sampled and interleaved activation protocols. In other implementations, generating the illumination light further includes generating a plurality of activation protocols temporally sampled and interleaved with one another at the TDM sampling rate, the plurality of activation protocols being for activating optical actuators present in another plurality of ROIs of the specimen, applying the spatio-temporal modulation to the illumination light further includes repeatedly imparting, at the pattern switching rate, a sequence of another plurality of spatial modulation patterns to the plurality of temporally sampled and interleaved activation protocols, each one of the other spatial modulation patterns mapping to a respective one of the other ROIs.

In some implementations, the spatio-temporal modulation is applied using one or more digital micromirror devices (DMDs). In some implementations, the TDM sampling rate and the pattern switching rate range from about 1 kHz to about 40 kHz, for example, from about 10 kHz to about 30 kHz.

In accordance with another aspect, there is provided an optogenetic system for probing a specimen, including:
an illumination unit configured to generate illumination light including a plurality of illumination protocols temporally sampled and interleaved with one another according to a time-division-multiplexed (TDM) scheme having a TDM sampling rate, each illumination protocol being for illuminating a respective region of interest (ROI) of a plurality of ROIs of the specimen;
a spatial light modulator (SLM) unit configured to apply a spatio-temporal modulation to the illumination light to produce modulated illumination light and to direct the modulated illumination light onto the specimen, the spatio-temporal modulation including repeatedly imparting, at a pattern switching rate, a sequence of a plurality of spatial modulation patterns to the plurality of temporally sampled and interleaved illumination protocols, each spatial modulation pattern mapping to a respective one of the ROIs; and
a control and processing unit operatively coupled to the illumination unit and the SLM unit, the control and processing unit being configured to match and synchronize the TDM sampling rate of the TDM scheme applied by the illumination unit with the pattern switching rate of the spatio-temporal modulation applied by the SLM unit.

In some implementations, the illumination unit includes an activation unit including at least one activation light source configured to generate, as the plurality of illumination protocols, a plurality of activation protocols for activating optical actuators present in the plurality of ROIs, respectively.

In some implementations, the illumination unit includes an excitation unit including at least one excitation light source configured to generate, as the plurality of illumination protocols, a plurality of excitation protocols for exciting optical reporters present in the plurality of ROIs, respectively. In such implementations, the optogenetic system further includes a detection unit configured to detect specimen light coming from the optical reporters present in the plurality of ROIs in response to the plurality of excitation protocols. The detection unit may include a single-element detector, also referred to as a single-point detector, configured to detect the specimen light in a time-resolved manner, and the specimen light may include fluorescence light. In some implementations, the detection unit is configured to detect the specimen light as a plurality of time-interleaved detection signals respectively associated with the plurality of ROIs, and the control and processing unit is configured to perform a time-demultiplexing operation on the detected specimen light for deinterleaving the plurality of time-interleaved detection signals. In some implementations, the SLM unit is disposed in a path of the specimen light and configured to repeatedly impart, at the pattern switching rate, the sequence of the plurality of spatial modulation patterns to the specimen light prior to the specimen light being detected by the detection unit.

In some implementations, the illumination unit further includes an activation unit including at least one activation light source configured to generate a plurality of activation protocols temporally sampled and interleaved with one another at the TDM sampling rate, the plurality of activation protocols being for activating optical actuators present in the plurality of ROIs. Furthermore, the SLM unit is configured to repeatedly impart, at the pattern switching rate, the sequence of the plurality of spatial modulation patterns to the plurality of temporally sampled and interleaved activation protocols. In other implementations, the illumination unit further includes an activation unit including at least one activation light source configured to generate a plurality of activation protocols temporally sampled and interleaved with one another at the TDM sampling rate, the plurality of activation protocols being for activating optical actuators present in another plurality of ROIs of the specimen. Furthermore, the SLM unit is configured to repeatedly impart, at the pattern switching rate, a sequence of another plurality of spatial modulation patterns to the plurality of temporally sampled and interleaved activation protocols, each one of the other spatial modulation patterns mapping to a respective one of the other ROIs.

In some implementations, the SLM unit includes one or more digital micromirror devices.

In accordance with another aspect, there is provided a non-transitory computer readable storage medium having stored thereon computer executable instructions that, when executed by a processor, cause the processor to perform various steps of a method of controlling an optogenetic system such as described herein.

In accordance with another aspect, there is provided a computer device for use with or in an optogenetic system such as described herein, the computer device including a processor and a non-transitory computer readable storage medium operatively coupled to the processor and having stored thereon computer readable instructions that, when executed by a processor, cause the processor to perform various steps for controlling the optogenetic system.

In accordance with another aspect, there is provided a system for optogenetic activation and monitoring of a specimen. The optogenetic system may include an activation unit including an activation light source configured to generate activation light, and an excitation unit including an excitation light source configured to generate excitation light. The activation light and the excitation light may have illumination spectra that are different from each other. The activation light may be used to activate optogenetic actuators disposed in the specimen to cause conformational changes in the actuators, thereby stimulating or inhibiting cell activity in the specimen. The excitation light may be used to excite optogenetic reporters disposed in the specimen. The optogenetic reporters may be configured to emit fluorescence light when cell activity is stimulated or inhibited through optical activation of the optogenetic actuators by the activation light.

The optogenetic system may also include an SLM, for example, a DMD or another suitable type of SLM. The SLM may be configured to spatially modulate the activation light and the excitation light, and to direct the resulting spatially patterned activation light and spatially patterned excitation light onto the specimen. The SLM may also be configured to spatially modulate specimen light, for example, fluorescence light, coming from the specimen in response to the excitation light and, in some cases, in response also to the activation light.

The optogenetic system may further include a detection unit including a detector, for example, a single-element detector, such as a photomultiplier tube (PMT) or an avalanche photodiode (APD). The detector may be configured to detect the spatially modulated specimen light coming from the SLM and generate, from the detected specimen light, a detection signal conveying information about the specimen. In other variants, however, the specimen light may not encounter the SLM along its path between the specimen and the detector. In such a case, the specimen light is not spatially modulated by the SLM prior to detection.

The optogenetic system may also include a control and processing unit operatively coupled to the activation light source, the excitation light source, the SLM, and the detector to control, at least partly, their operation.

In some implementations, the optogenetic system may include more than one activation light source and/or more than one excitation light source and/or more than one SLM and/or more than one detector. This may result in increased versatility and flexibility by providing more degrees of freedom for controlling and observing the spatial and/or temporal dynamics of cell activity.

In some implementations, the optogenetic system may be configured to implement a time-division-multiplexed (TDM) scheme that involves subsampling and interleaving in time a number of activation and/or excitation protocols, where each protocol is to be applied to a particular region of interest (ROI) of the specimen. In such implementations, the SLM may be used to spatio-temporally modulate the activation light and/or the excitation light onto the specimen at a modulation rate that is matched to and synchronized with the sampling rate of the TDM scheme. Such a TDM scheme may allow for activating and monitoring multiple ROIs of the specimen in parallel (i.e., quasi-simultaneously) to increase throughput.

In accordance with another aspect, there is provided a method for optogenetic activation and monitoring of a specimen. The method may include a step of generating activation light with an activation light source and generating excitation light with an excitation light source. Depending on the application, the activation light and the excitation light may be generated concurrently or not. The activation light and the excitation light may be used respectively to activate optogenetic actuators and excite optogenetic reporters disposed in the specimen. In order to mitigate or control crosstalk between the activation of optogenetic actuators by the activation light and the excitation of optogenetic reporters by the excitation light, actuator-reporter pairs with non-overlapping or negligibly overlapping activation and excitation spectra may be used.

The method may also include a step of using an SLM, for example, a DMD, to spatially modulate the activation light and the excitation light to produce spatially modulated activation and spatially modulated excitation light, and direct (e.g., by deflection from the SLM) the resulting spatially patterned activation light and spatially patterned excitation light onto the specimen. The SLM may also be used to spatially modulate specimen light emanating from the specimen in response to the excitation light (and possibly the activation light). However, in some implementations, the specimen light may not be spatially modulated by the SLM. Depending on the application, the spatial modulation pattern applied by the SLM may be stationary or vary in time, for example, depending on whether a single ROI or several ROIs are activated and/or observed.

The method may further include a step of detecting the spatially modulated specimen light and a step of generating, from the detected specimen light, a detection signal conveying information about the specimen. As noted above, in some embodiments, the specimen light emanating from the specimen may not be spatially modulated by the SLM.

In some implementations, the method may implement a time-division-multiplexed (TDM) scheme that allows for activating, exciting, and detecting multiple ROIs of the specimen in parallel. In such implementations, the method may include steps of identifying a plurality of ROIs of the specimen; determining a plurality of spatial light modulation patterns to be applied by the SLM, where each spatial light modulation pattern maps to a respective one of the identified ROIs; and determining a plurality of illumination protocols for probing the plurality of ROIs, respectively. Each illumination protocol may be defined by an activation time profile to be imparted to the activation light by the activation light source and/or an excitation time profile to be imparted to the excitation light by the excitation light source. Depending on the application, the activation and excitation time profiles of each illumination protocol may be either time-varying or time-invariant. Also, for each illumination protocol, either the activation time profile or the excitation time profile may be a constant zero-intensity function, if the corresponding ROI is to be either activated or excited, but not both.

In such implementations, the step of generating the activation light and the excitation light may include controlling the activation light source and the excitation light source to generate the activation light and the excitation light based on a TDM scheme by sampling and interleaving the plurality of illumination protocols at a TDM sampling rate. In some implementations, the amplitude of the activation time profile and/or the excitation time profile of each or any illumination protocol may be appropriately scaled (e.g., increased) to account for the fact that the illumination duration of each ROI is made shorter as a result of the sampling and interleaving operations. The step of using the SLM may include controlling the SLM to sequentially switch between the plurality of spatial light modulation patterns in accordance with the TDM scheme. This control may involve matching and synchronizing the SLM modulation rate with the TDM sampling rate. Furthermore, the step of detecting the specimen light (which may be spatially modulated or not, depending on the application) may include detecting the specimen light as a plurality of interleaved responses, where each interleaved response conveys information about a respective one of the ROIs. In such a case, a time-demultiplexing operation may be performed to recover the time profile of the response emanating from each ROI.

It is to be noted that other method and process steps may be performed prior to, during or after the steps described herein. The order of one or more steps may also differ, and some of the steps may be omitted, repeated, and/or combined, as the case may be. It is also to be noted that some method steps may be performed using various image processing techniques, which may be implemented in hardware, software, firmware or any combination thereof.

Other features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

BRIEF DESCRIPTION OF THE DRAWINGS

FIGS. 9A to 9C depict different illumination and detection scenarios that may be implemented with the embodiment of FIG. 8.

DETAILED DESCRIPTION

Figure 1:
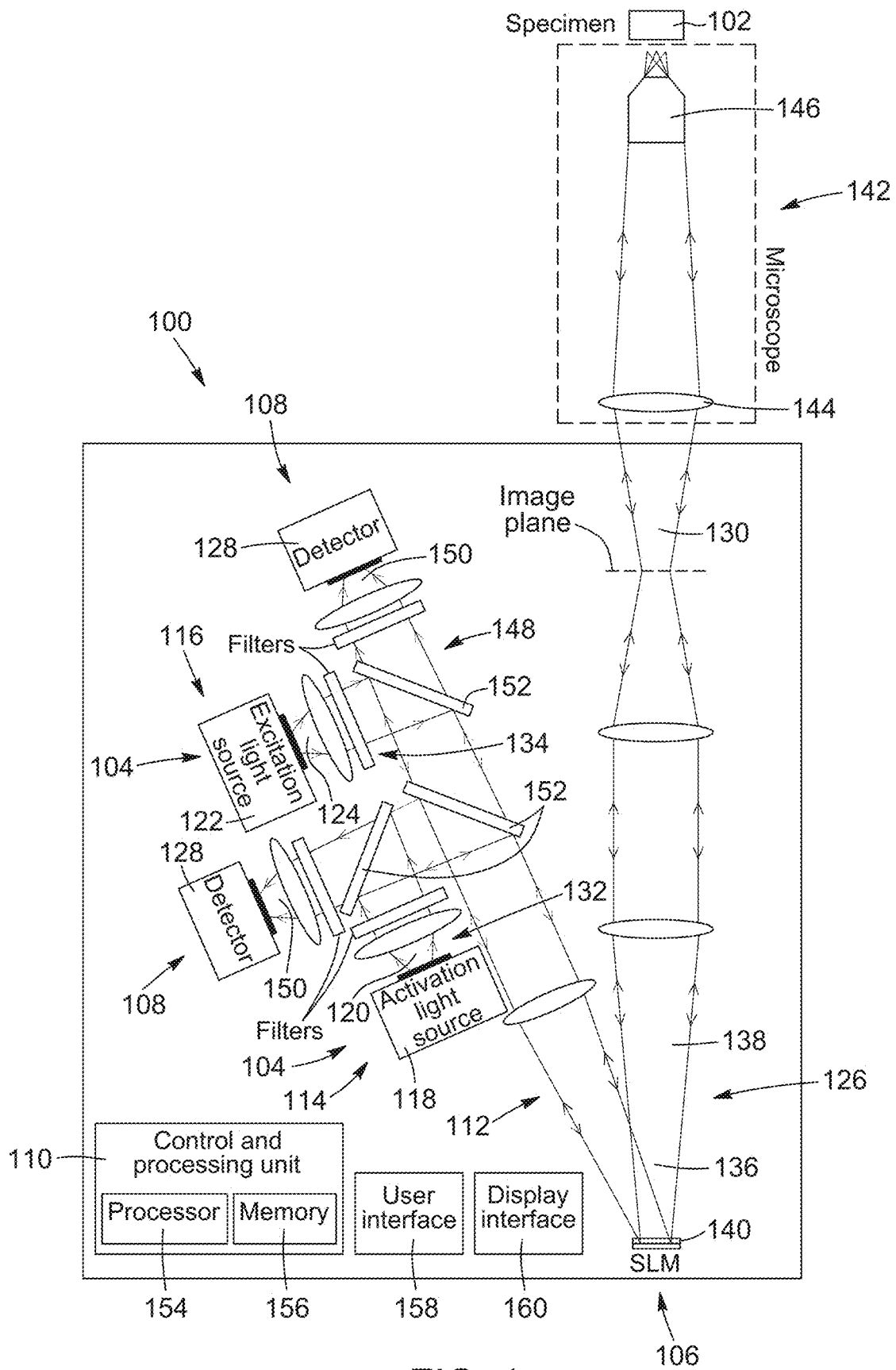
FIG. 1 is a schematic representation of an optogenetic system, in accordance with an embodiment.

In the present description, similar features in the drawings have been given similar reference numerals. To avoid cluttering certain figures, some elements may not be indicated if they were already identified in a preceding figure. It is appreciated that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures.

The terms "a", "an", and "one" are defined herein to mean "at least one", that is, these terms do not exclude a plural number of items, unless stated otherwise.

Terms such as "substantially", "generally", and "about", that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The terms "connected" and "coupled", and derivatives and variants thereof, are intended to refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The terms "match", "matching", and "matched" are intended to refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The term "concurrently" refers herein to two processes that occur during coincident or overlapping time periods. The term "concurrently" does not necessarily imply complete synchronicity but encompasses various scenarios including: time-coincident or simultaneous occurrence of two processes; occurrence of a first process that both begins and ends during the duration of a second process; and occurrence of a first process that begins during the duration of a second process, but ends after the completion of the second process.

The terms "light" and "optical", and variants and derivatives thereof, are intended to refer herein to radiation in any appropriate region of the electromagnetic spectrum. These terms are not limited to visible light but can also include invisible regions of the electromagnetic spectrum including, without limitation, the terahertz (THz), infrared (IR), and ultraviolet (UV) spectral bands. For example, in non-limiting embodiments, the present techniques may be implemented with light having a wavelength band lying somewhere in the range from about 400 to about 780 nanometers (nm). However, this range is provided for illustrative purposes only and the present techniques may operate outside this range.

The terms "probe" and variants thereof are intended to refer herein to any optical system which can deliver optical energy to a region of interest and/or collect optical energy from the region of interest. In particular, the term "probe" and variants thereof are meant to encompass optical systems used solely for light delivery (e.g., activation and/or excitation), solely for light collection (e.g., fluorescence detection), and for both light delivery and collection.

The present description generally relates to optogenetic systems and methods that use spatio-temporal light modulation to achieve all-optical manipulation and observation of space- and time-dependent processes occurring in a specimen.

The present techniques may be used with a variety of specimens, notably biological specimens, which may be studied in vivo, in vitro, or ex vivo. Non-limiting examples of biological specimens that may be studied using the present techniques include, to name a few, cells, tissues, organs, organisms, subcellular components, and other biological materials. Notably, the present techniques may be used to probe living cells expressing optogenetic proteins.

The present techniques may find use in a wide range of medical and biological imaging applications, notably in the study, diagnosis, treatment, and cure of various diseases and disorders that involve the excitability of cells, such as neurons and myocytes. Furthermore, the present techniques may be implemented with or in various types of microscopy modalities including, but not limited to, widefield microscopy, confocal microscopy, and other types of fluorescence-based microscopy. It is appreciated, however, that some implementations of the present techniques may be used in applications other than optogenetics, such as in thermal stimulation applications. For example, the present techniques may be used with non-biological specimens to control and observe certain events (e.g., chemical reactions) occurring in a specimen. In such applications, activation light may be used to initiate a change in a specimen and excitation light may be used to excite the specimen to emit light in response to the change. The characteristics of the emitted light may be detected and analyzed to convey information about the change.

As described in greater detail below, an optogenetic method for probing a plurality of regions of interest (ROIs) of a specimen may include a step of generating illumination light including a plurality of illumination protocols. The illumination protocols are temporally sampled and interleaved with one another at a time-division-multiplexed (TDM) sampling rate. Each illumination protocol is intended for illuminating a respective one of the ROIs. The method may also include a step of applying a spatio-temporal modulation to the illumination light to produce modulated illumination light and directing the modulated illumination light onto the specimen. The spatio-temporal modulation may include repeatedly imparting, at a pattern switching rate matched and synchronized with the TDM sampling rate, a sequence of a plurality of spatial modulation patterns to the plurality of temporally sampled and interleaved illumination protocols, where each spatial modulation pattern maps to the ROI associated with its respective illumination protocol.

In some scenarios, the plurality of illumination protocols may be a plurality of activation protocols for activating optical actuators present in the ROIs. In other scenarios, the plurality of illumination protocols may be a plurality of excitation protocols for exciting optical reporters present in the plurality of ROIs. In such scenarios, the method may include a step of detecting specimen light, for example, fluorescence light, coming from the optical reporters in response to the plurality of excitation protocols, and a step of generating, from the detected specimen light, detection signal data conveying information about the specimen. Detecting the specimen light may include detecting a plurality of time-interleaved detection signals respectively associated with the plurality of ROIs, and generating the detection signal data may include performing a time-demultiplexing operation on the detected specimen light for deinterleaving the plurality of time-interleaved detection signals. Depending on the application, the spatio-temporal modulation may or may not be applied to the specimen light prior to its detection. In yet other scenarios, the illumination light may include both a plurality of activation protocols and a plurality of excitation protocols, which may be used for activating/exciting either a same set or different sets of ROIs.

Various aspects and implementations of the present techniques are described below with reference to the figures.

Referring to FIG. 1, there is illustrated a possible embodiment of a system 100 for probing a specimen 102 by optogenetic activation and monitoring. The specimen 102 can include cells that have been genetically encoded to express (1) one or more optogenetic actuators of electrical or chemical activity and (2) one or more optogenetic reporters of electrical or chemical activity.

Optogenetic actuators are typically genetically encoded proteins that can change their conformation upon exposure to light of specific wavelength, thereby initiating an action potential in the cells in which they are expressed. Common optogenetic actuators include opsins, such as light-gated ion channels or pumps, and optical switches. For example, the optogenetic actuators may be microbial opsins, such as channelrhodopsins, halorhodopsins, archaerhodopsins, and leptosphaeria rhodopsins. Depending on the application, the optogenetic actuators may be stimulatory (e.g., depolarizing) or inhibitory (e.g., hyperpolarizing). However, any other suitable types of optogenetic actuators may be used in other embodiments. It is appreciated that optogenetic actuators and their applications and principles of operation are generally known in the art and need not be described in greater detail herein.

Optogenetic reporters are typically genetically encoded light-sensitive fluorescent proteins, dyes, or other compounds or biomolecules whose emission characteristics vary in response to physical and/or biochemical changes within cells in which they are expressed. For example, optogenetic reporters may emit fluorescence light in response to changes in intracellular calcium concentration (calcium reporters) or changes in membrane potential (voltage reporters) initiated via light-mediated activation of optogenetic actuators. Common optogenetic reporters include Archon1, Anine 6+, and VARNAM. However, any other suitable types of optogenetic reporters may be used in other embodiments. It is appreciated that, as for optogenetic actuators, optogenetic reporters and their applications and principles of operation are generally known in the art and need not be described in greater detail herein.

In the embodiment of FIG. 1, the optogenetic system 100 generally includes an illumination unit 104, a spatial light modulator (SLM) unit 106, a detection unit 108, and a control and processing unit 110.

The illumination unit 104 is configured to generate illumination light 112 for probing the specimen 102. The illumination unit includes an activation unit 114 and an excitation unit 116. The activation unit 114 includes an activation light source 118 configured to generate activation light 120. The excitation unit 116 includes an excitation light source 122 configured to generate excitation light 124. The activation light 120 and the excitation light 124 together form the illumination light 112. The SLM unit 106 is configured to apply a spatio-temporal modulation to the illumination light 112 to produce modulated illumination light 126 and to direct the modulated illumination light 126 onto the specimen 102. The detection unit 108 includes a detector 128 configured to detect specimen light 130 emanating from the specimen 102. The control and processing unit 110 is operatively coupled at least to the activation unit 114 and the excitation unit 116 of the illumination unit 104, the SLM unit 106, and the detection unit 108 to control, at least partly, their operation. The structure and operation of these and other possible components of the optogenetic system 100 are described in greater detail below.

It is appreciated that FIG. 1 is a simplified schematic representation that illustrates a number of basic components of the optogenetic system 100, such that additional features and components that may be useful or necessary for proper operation of the system 100 may not be specifically depicted. Non-limiting examples of such additional features and components may include optical components such as relay lenses, tube lenses, optical filters, mirrors, and the like, configured to condition and/or direct the activation light 120, the excitation light 124, and the specimen light 130.

In FIG. 1, the activation unit 114 includes a single activation light source 118 to generate the activation light 120 along an activation light path 132, and the excitation unit 116 includes a single excitation light source 122 to generate the excitation light 124 along an excitation light path 134. It is appreciated, however, that more than one activation light source 118 and/or more than one excitation light source 122 may be provided in other embodiments. The activation light source 118 and the excitation light source 122 may each be embodied by any appropriate device or combination of devices capable of generating activation light 120 and excitation light 124 having characteristics that are suitable for optogenetic applications, respectively. Non-limiting examples of possible light sources include, to name a few, semiconductor light-emitting diodes (LEDs), organic light-emitting diodes (OLEDs), polymer light-emitting diodes (PLEDs), semiconductor laser diodes, solid-state lasers, gas lasers, and dye lasers. It is to be noted that using LED sources, instead of laser sources for generating the illumination light 112 may, in some instances, be advantageous in terms of cost and simplicity. Depending on the application, the activation light source 118 and the excitation light source 122 may be operated in either a continuous or intermittent (e.g., pulsed) regime, and may or may not be modulated. As can be appreciated, each of the activation light source 118 and the excitation light source 122 may be selected based on various factors including, without limitation, its operation wavelength; irradiance; spatial, temporal, and spectral profiles; beam quality and divergence; degree of coherence; compactness; reliability; and, for a pulsed source, pulse characteristics, such as its peak power, repetition rate, duration, temporal shape, and center wavelength.

The activation light source 118 may emit the activation light 120 according to an activation protocol having an activation time profile. The activation time profile may represent how the intensity of the activation light 120 varies (or not) as a function of time during the activation protocol. Likewise, the excitation light source 122 may emit the excitation light 124 according to an excitation protocol having an excitation time profile. The excitation time profile may represent how the intensity of the excitation light 124 varies (or not) as a function of time during the excitation protocol. Thus, in operation of the optogenetic system 100, there may be times where both the activation light source 118 and the excitation light source 122 are illuminating the specimen 102, times where only one of the activation light source 118 and the excitation light source 122 is illuminating the specimen 102, and times where neither the activation light source 118 nor the excitation light source 122 is illuminating the specimen 102.

The activation light 120 may be used to activate optogenetic actuators disposed in the specimen 102 to cause conformational changes in the optogenetic actuators and, in turn, stimulate or inhibit cell activity in the specimen 102. To this end, the activation light 120 may have a wavelength suitable for activating the optogenetic actuators disposed in the specimen 102, such as between about 420 nm and about 500 nm. For example, the wavelength of the activation light 120 is equal to 460 nm in FIG. 1, corresponding to blue light. However, as can be appreciated, the activation light 120 may have any suitable activation wavelength, or range of activation wavelengths, whether in the visible range or in any other appropriate region of the electromagnetic spectrum.

The excitation light 124 may be used to excite optogenetic reporters disposed in the specimen 102, where the optogenetic reporters may be configured to emit radiation (e.g., fluorescence light) when cell activity is stimulated and/or inhibited following activation of optogenetic actuators. The excitation light 124 may have a wavelength suitable for exciting the fluorescence of the optogenetic reporters disposed in the specimen 102, such as between about 600 nm and about 650 nm. For example, the wavelength of the excitation light 124 is equal to 620 nm in FIG. 1, corresponding to red-orange light. However, as can be appreciated, the excitation light 124 may have any suitable excitation wavelength or range of excitation wavelengths, whether in the visible range or in any other appropriate region of the electromagnetic spectrum.

In some implementations, the activation light 120 and the excitation light 124 may have spectral profiles with no or little overlap, to avoid or reduce the risk of unwanted crosstalk between the activation of optogenetic actuators by the activation light 120 and the excitation of the optogenetic reporters by the excitation light 124. In particular, in some cases it may be desirable or required that the activation light 120 does not induce fluorescence from reporters and/or that the excitation light 124 does not activate actuators.

Referring still to FIG. 1, the SLM unit 106 is disposed along the activation light path 132 and the excitation light path 134, at a conjugate image plane of the optogenetic system 100. The SLM unit 106 is configured to spatially modulate the activation light 120 and the excitation light 124 forming the illumination light 112 according to a spatial modulation pattern to produce spatially patterned or modulated activation light 136 and spatially patterned or modulated excitation light 138, respectively.

The modulated activation light 136 and the modulated excitation light 138 together form the modulated illumination light 126. The SLM unit 106 is also configured to direct the modulated activation light 136 and the modulated excitation light 138 onto the specimen 102. The spatial modulation pattern imparted by the SLM unit 106 to the activation light 120 and the excitation light 124 maps to a corresponding ROI of the specimen 102, which is to be illuminated by the activation light 120 and the excitation light 124. Depending on the application, the ROI corresponding to a certain spatial modulation pattern defined by the SLM unit 106 may have various sizes, shapes, and configurations, and may consist of either a single area of the specimen 102 or a set of distinct and unconnected areas of the specimen 102.

In the embodiment of FIG. 1, the SLM unit 106 includes an SLM 140 embodied by a digital micromirror device (DMD). The DMD functions as both an addressable binary-mask spatial filter and a high-speed light deflector interposed in the activation light path 132 and the excitation light path 134. The DMD includes a two-dimensional array of highly reflective, micrometer-sized mirrors. Each micromirror may be individually addressed and switched between two resting states. Each resting state may be defined by a respective discrete angular position or tilt angle of the micromirror relative to a flat state parallel to the plane of the micromirror array. Depending on the application, any of the number, size, shape, tilt angle, material, and switching rate of the micromirrors of the DMD may be varied. In one exemplary embodiment, the DMD may include an array of 1024×768 square aluminum micromirrors, where each micromirror is about 10 μm in size, with a tilt angle of ±12° and a switching rate of 32 kilohertz (kHz).

Each micromirror of the DMD acts as a dual reflector that deflects light incident thereon along either one of two distinct optical paths depending on its current resting state. Each micromirror is said to be in an "on" or "activated" state if light incident thereon (e.g., a portion of the activation light 120 and/or a portion of the excitation light 124) is deflected onto the specimen 102. Conversely, each micromirror is said to be in an "off" or "deactivated" state if light incident thereon is deflected away from the specimen 102, for example, into a beam dump (not shown). Thus, at any given time, the DMD may include an "activated portion", formed by all of the micromirrors that are in their activated state, and a "deactivated portion", formed by all of the micromirrors that are in their deactivated state.

It is appreciated that the construction and operation of DMDs are generally known in the art and need not be described in greater detail herein. DMDs have become a mature, reliable, and relatively low-cost technology, which can provide high-speed and high-resolution spatio-temporal patterns for structured illumination and structured detection over large fields of view. In particular, DMDs offer various possibilities for controlling, both in space and over time, the illumination pattern of the activation light 120 and the excitation light 124 at the specimen 102. In addition, by sequentially activating groups of micromirrors, or single mirrors for higher resolution, point-scanning imaging of the specimen 102 can be achieved. It is also appreciated that while the SLM unit 106 includes an SLM 140 embodied by a DMD in the embodiment of FIG. 1, other embodiments may use other types of SLMs instead of, or in addition to, DMDs. Non-limiting types of SLMs include electrically addressed spatial light modulators (e.g., using ferroelectric liquid crystals or nematic liquid crystals), optically addressed spatial light modulators, and other suitable SLMs, which may or may not be based on dual-state SLM pixels.

By varying in time the spatial modulation pattern imparted by the SLM unit 106 to the activation light 120 and the excitation light 124, a variety of spatio-temporal illumination patterns may be achieved for activating and/or exciting different ROIs of the specimen 102 at different times over a selected time period. In particular, by controlling the activation light source 118 and the excitation light source 122 to emit the activation light 120 and the excitation light 124 at different times, and by coordinating the operation of the light sources 118, 122 with the operation of the SLM unit 106, one can devise optogenetic protocols in which ROIs of the specimen 102 are activated and/or excited according to different spatio-temporal illumination patterns.

The optogenetic system 100 of FIG. 1 is configured to implement a time-division-multiplexed (TDM) scheme that involves temporally subsampling and interleaving, at a TDM sampling rate, a plurality of activation and/or excitation protocols, where each protocol relates to a certain ROI of the specimen 102. In such implementations, referred to as TDM implementations, the SLM unit 106 is used to spatio-temporally modulate the activation light 120 and the excitation light 124 at a pattern switching rate that is matched to and synchronized with the TDM sampling rate, thus enabling a spatio-temporally multiplexed activation and/or excitation of the specimen 102. The implementation of such a TDM scheme may allow for several ROIs to be activated and/or excited in parallel to increase throughput.

It is to be appreciated that SLMs based on commercially available DMDs can provide structured illumination and deflection at high-speed modulation rates of up to 32 kHz, corresponding to switching times of the order of 30 microseconds (μs). Such switching times are significantly faster than the response times associated with common optogenetic actuators, which are of the order of milliseconds for changes in membrane potential and of the order of tens of milliseconds for changes in calcium ion concentration. Thus, it can be envisioned to use the present techniques to temporally multiplex illumination/detection protocols associated with different ROIs of a specimen by sampling and interleaving them, such that the samples of each illumination/detection protocols occupy different time positions and thus do not overlap, while maintaining a suitable temporal resolution for activation, excitation, and detection.

Figure 2:
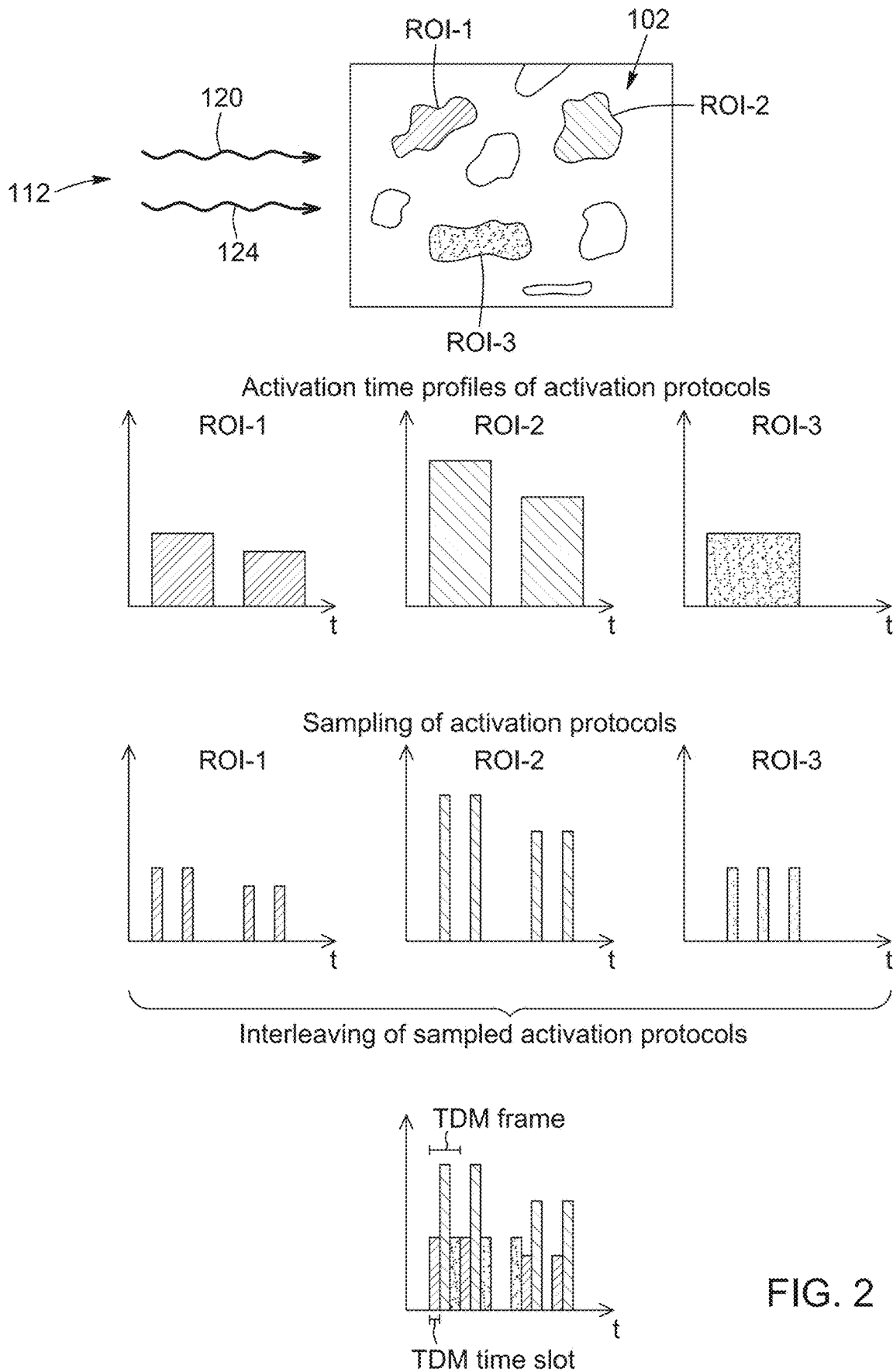
FIG. 2 is a schematic representation of aspects of a method of operation of an optogenetic system implementing a time-division-multiplexing (TDM) of illumination protocols, in accordance with another embodiment.
Figure 2:
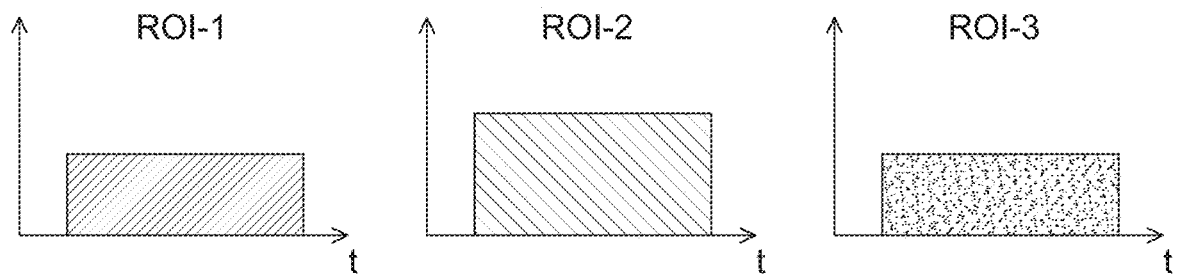
Figure 2:
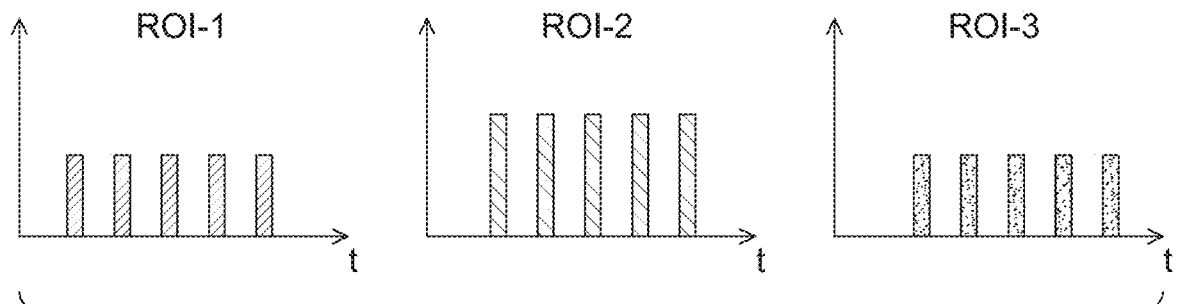
Figure 2:
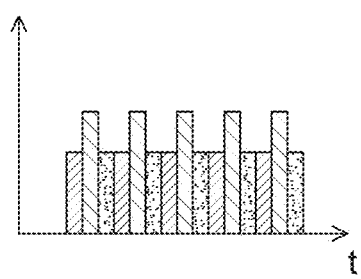

Referring to FIG. 2, various aspects of a method of operation of the optogenetic system 100 of FIG. 1 related to TDM implementations will be described. The method may include a step of identifying a plurality of ROIs of the specimen 102 to be probed in parallel according to the TDM scheme. In FIG. 2, three ROIs of the specimen have been identified: ROI-1, ROI-2, and ROI-3. However, depending on the application, the number of ROIs that may be probed using the TDM scheme disclosed herein can range from two to up to a thousand or more.

Various methods may be used for identifying the ROIs to be probed. For example, the ROIs may be identified by analyzing an initial or previously obtained image of the specimen 102. The initial image of the specimen 102 may be obtained with the system used to perform the optogenetic method or with another suitable imaging system. The initial image may have a relatively coarse resolution and may have been acquired in a relatively short acquisition time. In some embodiments, the system used to perform the optogenetic method (e.g., the optogenetic system 100 of FIG. 1) may be used to acquire such a relatively coarse image. For example, acquiring the relatively coarse image may involve implementing a point-by-point scanning of the specimen via a sequential activation of groups of micromirrors of the DMD, rather than single mirrors, for a lower spatial resolution by a faster acquisition time. Depending on the application, the analysis of the initial image of the specimen in order to identify ROIs therein may be performed by a human and/or a computer. As can be appreciated, various computer-implemented and software-based techniques may be employed for this purpose. Such tools and techniques may use matching algorithms based on feature extraction and pattern recognition, and may rely on machine learning and/or artificial intelligence. In some implementations, a composite image of the specimen 102 may be obtained by combining the non- ROI portions of the initial image used to identify the ROIs and the images of the ROIs obtained using the TDM scheme described below.

Referring still to FIG. 2, the method of operation may include generating the illumination light 112 to include a plurality of illumination protocols for probing the plurality of ROIs. Each illumination protocol is intended for illuminating a respective one of the ROIs. In some embodiments, the plurality of illumination protocols is a plurality of activation protocols for activating optical actuators present in the ROIs, while in other embodiments, the plurality of illumination protocols is a plurality of excitation protocols for exciting optical reporters present in the plurality of ROIs. In yet other embodiments, the illumination light 112 includes both a plurality of activation protocols, forming the activation light 120, and a plurality of excitation protocols, forming the excitation light 124.

In the embodiment of FIG. 2, the illumination light 112 is made up of both activation light 120 and excitation light 124. The activation light 120 includes three activation protocols, one for each of the ROIs. Likewise, the excitation light 124 includes three excitation protocols, one for each of the ROIs. In FIG. 2, the activation protocols and the excitation protocols are associated with the same set of ROIs. However, in other embodiments, the ROIs associated with the activation protocols may not be all identical to the ROIs associated with the excitation protocols. Depending on the application, the activation/excitation time profile associated with each activation/excitation protocol may be time-varying or time-invariant. Furthermore, the activation/excitation time profile associated with each activation/excitation protocol may be a constant zero-intensity function, if the corresponding ROI is to be either activated or excited, but not both.

For simplicity, in FIG. 2 the activation and excitation protocols all have the same onset time, but this is not a requirement. The activation protocols associated with ROI-1 and ROI-2 both include two equal-duration activation periods separated by a non-activation period, while the activation protocol associated with ROI-3 includes a single activation period that lasts until the end of the non-activation period for ROI-1 and ROI-2. Meanwhile, the excitation protocols associated with ROI-1, ROI-2, and ROI-3 are all time-constant functions, with the excitation intensity for ROI-1 being less than that for ROI-2 and equal to that for ROI-3. Of course, the activation and excitation time profiles of the activation and excitation protocols depicted in FIG. 2 are provided for illustrative purposes only, and any suitable activation and excitation time profiles may be used in other embodiments.

In TDM implementations, the step of generating the activation light and the excitation light may include a step of controlling, for example, with a control and processing unit such as described herein, the activation light source and the excitation light source to generate the activation light and the excitation light based on a TDM scheme. The TDM scheme may include temporally sampling and interleaving the plurality of activation protocols at a TDM sampling rate, and likewise for the plurality of excitation protocols. The steps of sampling and interleaving the activation time profiles for ROI-1, ROI-2, and ROI-3 are depicted schematically in FIG. 2, and likewise for the steps of sampling and interleaving the three excitation time profiles.

In some implementations, the amplitude of the activation/excitation time profile of each activation/excitation protocol may be appropriately scaled (e.g., increased) to compensate for any possible reduced activation and excitation durations resulting from the sampling and interleaving operations. It is appreciated that the TDM scheme depicted in FIG. 2 uses time slots of equal duration for each ROI, such that the duration of one TDM frame is equal to N times the duration of one time slot, where N is the number of ROIs to be probed in parallel. However, this need not be the case in other variants, where different and/or more complex TDM schemes may be employed without departing from the scope of the present description. It is noted that the TDM sampling rate is defined as the rate of change between time slots. Thus, if the time slots associated with the different ROIs are not all of equal duration, the TDM sampling rate will vary as a function of time during each TDM frame. In FIG. 2, the TDM sampling rate is constant and equal to the inverse of the duration of the time slots.

It is appreciated that the TDM scheme illustrated in the embodiment of FIG. 2 is provided for illustrative purposes only, and that various other TDM schemes could be used in other embodiments. In particular, more elaborate TDM schemes could be devised in implementations where the optogenetic system includes more than one activation light source, more than one excitation light source, more than one SLM, and/or more than one detector (see, e.g., FIGS. 5, 7, and 8), while still providing time-interleaving of a plurality of subsampled activation and/or excitation protocols, where each protocol corresponds to a particular ROI of a specimen under investigation. It is also appreciated that the TDM approach disclosed herein can generally be implemented with only a set of activation protocols (i.e., without excitation/detection), only a set of excitation/detection protocols, and both a set of activation protocols and a set of excitation/detection protocols (as in the case of FIG. 2).

Returning to FIG. 1, in TDM implementations, the operation of the optogenetic system 100 may include a step of determining a plurality of spatial modulation patterns to be applied by the SLM unit 106 to the illumination light 112 that illuminates the plurality of identified ROIs of the specimen 102, where each spatial light modulation pattern corresponds or maps to a respective one of the ROIs. As can be appreciated, SLMs such as DMDs can be controlled and programmed by software to determine a spatial illumination pattern that corresponds to each one of the identified ROIs. Once the plurality of spatial modulation patterns associated with the plurality of ROIs has been determined, the operation of the optogenetic system 100 can include a step of controlling the SLM unit 106, for example, with the control and processing unit 110, to apply a spatio-temporal modulation to the illumination light 112 formed of the activation light 120 and the excitation light 124. The application of the spatio-temporal modulation may include repeatedly imparting, at a pattern switching rate matched and synchronized with the TDM sampling rate, a sequence of a plurality of spatial modulation patterns to the plurality of temporally sampled and interleaved activation and excitation protocols. Each spatial modulation pattern maps to a respective ROI of the specimen 102 to ensure that each ROI to be probed is activated and/or excited by its associated activation and/or excitation protocol(s).

The operation of sequentially switching between the plurality of spatial light modulation patterns in accordance with the TDM scheme involves matching and time-coordinating the SLM pattern switching rate with the TDM sampling rate. In FIG. 1, this can involve synchronizing the transitions between successive DMD patterns with the transitions between successive TDM time slots. For example, a DMD having a pattern switching rate of 32 kHz would correspond to a TDM time slot duration of 31.25 µs. In such a case, it could be envisioned to perform TDM-based voltage imaging on 16 ROIs in parallel. In this case, the TDM frame duration (i.e., the time between time slots associated with the same ROI) would be equal to 16×31.25 µs=0.5 millisecond (ms), which is of the order of typical response times associated with changes in membrane potential. Likewise, it could also be envisioned to perform TDM-based calcium imaging on 1000 ROIs in parallel. The TDM frame duration in this case would be equal to 1000×31.25 µs=31.25 ms, which is of the order of typical response times associated with changes in calcium ion concentration. It is appreciated that the TDM sampling rate and the pattern switching rate can have different values depending on the requirements or particularities of the intended application. In some embodiments, the TDM sampling rate and the pattern switching rates can range from about 1 kHz to about 40 kHz, for example, from about 10 kHz to about 30 kHz, although other values outside this range, both below and above, may be used in other embodiments.

Referring still to FIG. 1, the modulated activation light 136 and the modulated excitation light 138 forming the modulated illumination light 126 produced by the SLM unit 106 are projected onto the specimen 102 via an optical assembly 142, for example, an optical microscope, optically coupled to the optogenetic system 100. The optical assembly 142 generally includes imaging optics to receive the modulated illumination light 126 and direct it onto the specimen 102. In FIG. 1, the optical assembly 142 includes a combination of a tube lens 144 and an infinity-corrected objective 146. The tube lens 144 and the objective 146 together define a field of illumination for the modulated activation light 136 and the modulated excitation light 138 on the specimen 102. The size of the region of the specimen 102 corresponding to any given micromirror of the DMD of the SLM unit 106 depends on the overall magnification provided by the optogenetic system 100 and the optical assembly 142. It is appreciated that the configuration of the optical assembly 142 depicted in FIG. 1 is provided for illustrative purposes only, as various other configurations may be used in other embodiments, which may include different and/or additional optical components (e.g., beam-conditioning optics and beam-directing optics). It is also appreciated that the general principles underlying the construction and operation of optical microscopes, including those used for fluorescence microscopy, are generally known in the art and need not be described in greater detail herein.

Upon reaching the specimen 102, the modulated activation light 136 can activate optogenetic actuators disposed in the specimen 102 to stimulate or inhibit cell activity in the specimen 102, while the modulated excitation light 138 can excite optogenetic reporters disposed in the specimen 102. As noted above, the optogenetic reporters may be configured to emit fluorescence light, referred to as specimen light 130, upon stimulation or inhibition of cell activity via light-mediated activation of the optogenetic actuators. Depending on the application, the specimen light 130 emitted from the specimen 102 may originate not only from fluorescence emission of optogenetic reporters induced by the modulated excitation light 138 (and possibly also by the modulated activation light 136), but also from scattering, reflection, and/or transmission of the modulated activation light 136 and/or the modulated excitation light 138, as well as from other processes including, but not limited to, phosphorescence, Raman emission, thermal emission, and other linear and nonlinear optical processes.

Referring still to FIG. 1, a part of the specimen light 130 emitted from the specimen 102 is collected by the objective 146 and relayed back toward the SLM unit 106 along a detection light path 148 leading to the detection unit 108. In particular, the detection unit 108 is configured to detect specimen light 130 coming from the optical reporters present in the plurality of ROIs in response to the plurality of excitation protocols. The SLM unit 106 is disposed along the detection light path 148 and configured to spatio-temporally modulate the specimen light 130 (e.g., fluorescence light) to produce modulated specimen light 150. In particular, in TDM implementations, the SLM unit 106 is configured to repeatedly impart, at the pattern switching rate, the sequence of the plurality of spatial modulation patterns to the specimen light 130 prior to the specimen light 130 being detected by the detection unit 108 as the modulated specimen light 150. In this case, the detection unit is configured to detect the modulated specimen light 150 as a plurality of time-interleaved detection signals respectively associated with the plurality of ROIs. Each time-interleaved detection signal conveys information about its associated ROI. As described below, a time-demultiplexing operation can be performed to retrieve the contribution from each ROI from the time-interleaved detection signals.

When the SLM unit 106 is a DMD, any portion of the specimen light 130 that impinges on an activated micromirror will be deflected toward the detection unit 108 as modulated specimen light 150. Conversely, any portion of the specimen light 130 that impinges on an deactivated micromirror will be deflected away from the detection unit 108 (e.g., into a beam dump). Using the SLM unit 106 to provide structured illumination and structured detection operating at the same time may be advantageous in that the SLM unit 106 may provide confocal sectioning for both illumination and detection. However, in other implementations (see, e.g., FIG. 5), the specimen light 130 may not be spatially modulated by the SLM unit 106. That is, the SLM unit 106 may provide structured illumination but not structured detection. This may be achieved by providing, between the specimen 102 and the SLM unit 106, a dichroic mirror or another device or combination of devices able to separate the specimen light 130 from the modulated activation light 136 and the modulated excitation light 138 and direct the separated specimen light 130 toward the detection unit 108.

In FIG. 1, the detection unit 108 includes two detectors 128, each of which for detecting the modulated specimen light 150 in a respective spectral band. The optogenetic system 100 may include one or more dichroic mirrors 152 or other suitable spectrally selective devices to separate the modulated specimen light 150 from the activation light 120 and the excitation light 124, and direct the modulated specimen light 150 thus separated toward one of the detectors 128. The detectors 128 are configured to detect the modulated specimen light 150 coming from the SLM unit 106 and generate therefrom a detection signal conveying information about the specimen 102. Each detector 128 may be made up of one or more photosensitive elements capable of detecting input electromagnetic radiation and generating a detection signal therefrom, typically by converting the detected radiation into electrical data.

In some embodiments, the detection unit 108 may include a single-element detector configured to detect the modulated specimen light 150 in a time-resolved manner. For example, in FIG. 1, the detectors 128 can be photomultiplier tubes (PMTs), although other embodiments may use other types of single-element detectors such as avalanche photodiodes (APDs), silicon photomultipliers (SiPMs), and silicon photodiodes (SiPDs). It is appreciated that using fast, single-element detectors rather than comparatively slower arrays of detectors, such as charge-coupled-device (CCD) imagers, complementary metal-oxide-semiconductor (CMOS) imagers, and charge-injection-device (CID) imagers, may provide a number of advantages. Non-limiting examples of such advantages include, to name a few, better compatibility with the fast modulation of DMDs; improved sensitivity and response time; and improved signal-to-noise ratio by spatial integration of the signal coming from the entire ROI imaged by the DMD. It is appreciated, however, that some embodiments can use array of detectors instead of, or in addition to, single-element detectors, without departing from the scope of the present description.

Referring still to FIG. 1, the control and processing unit 110 refers to an entity of the optogenetic system 100 that controls and executes, at least partly, the functions required to operate or communicate with the various components of the optogenetic system 100 including, but not limited to, the illumination unit 104, the SLM unit 106, and the detection unit 108. The control and processing unit 110 may generally include a processor 154 and a memory 156. The control and processing unit 110 may be configured to control and synchronize, via suitable controllers or drivers, the operation of the activation unit 114, the excitation unit 116, the SLM unit 106, and the detection unit 108 to implement a TDM scheme such as noted above. For example, the control and processing unit 110 may be configured to match and synchronize the TDM sampling rate of the TDM scheme applied by the illumination unit 104 on the illumination light 112 with the pattern switching rate of the spatio-temporal modulation applied by the SLM unit 106. The control and processing unit 110 may also be configured to receive and perform a time-demultiplexing operation on the detected modulated specimen light 150 for deinterleaving the plurality of time-interleaved detection signals resulting from the use of the TDM scheme. The control and processing unit 110 may further be configured to generally process and analyze the detection data generated by the detection unit 108 using suitable image processing techniques.

The control and processing unit 110 may be provided within one or more general purpose computers and/or within any other suitable computing devices, implemented in hardware, software, firmware, or any combination thereof, and connected to various components of the optogenetic system 100 via appropriate wired and/or wireless communication links and ports. Depending on the application, the control and processing unit 110 may be integrated, partly integrated, or physically separate from the optical hardware of the optogenetic system 100.

The processor 154 may implement operating systems, and may be able to execute computer programs, also generally known as commands, instructions, functions, processes, software codes, executables, applications, and the like. It should be noted that although the processor 154 in FIG. 1 is depicted as a single entity for illustrative purposes, the term "processor" should not be construed as being limited to a single processor, and accordingly, any known processor architecture may be used. In some implementations, the processor 154 may include a plurality of processing units. Such processing units may be physically located within the same device, or the processor 154 may represent processing functionality of a plurality of devices operating in coordination. For example, the processor 154 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 156, which may also be referred to as a "computer readable storage medium" is capable of storing computer programs and other data to be retrieved by the processor 154. In the present description, the terms "computer readable storage medium" and "computer readable memory" are intended to refer to a non-transitory and tangible computer product that can store and communicate executable instructions for the implementation of various steps of the methods disclosed herein. The computer readable memory may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer.

In some implementations, the optogenetic system 100 may include a user interface 158 and a display interface 160 operatively coupled to the control and processing unit 110 and from which aspects or features of the present techniques may be accessed and controlled. The user interface 158 and the display interface 160 may allow the input of commands and queries to the optogenetic system 100, as well as present the outcomes of the commands and queries.

Figure 3:
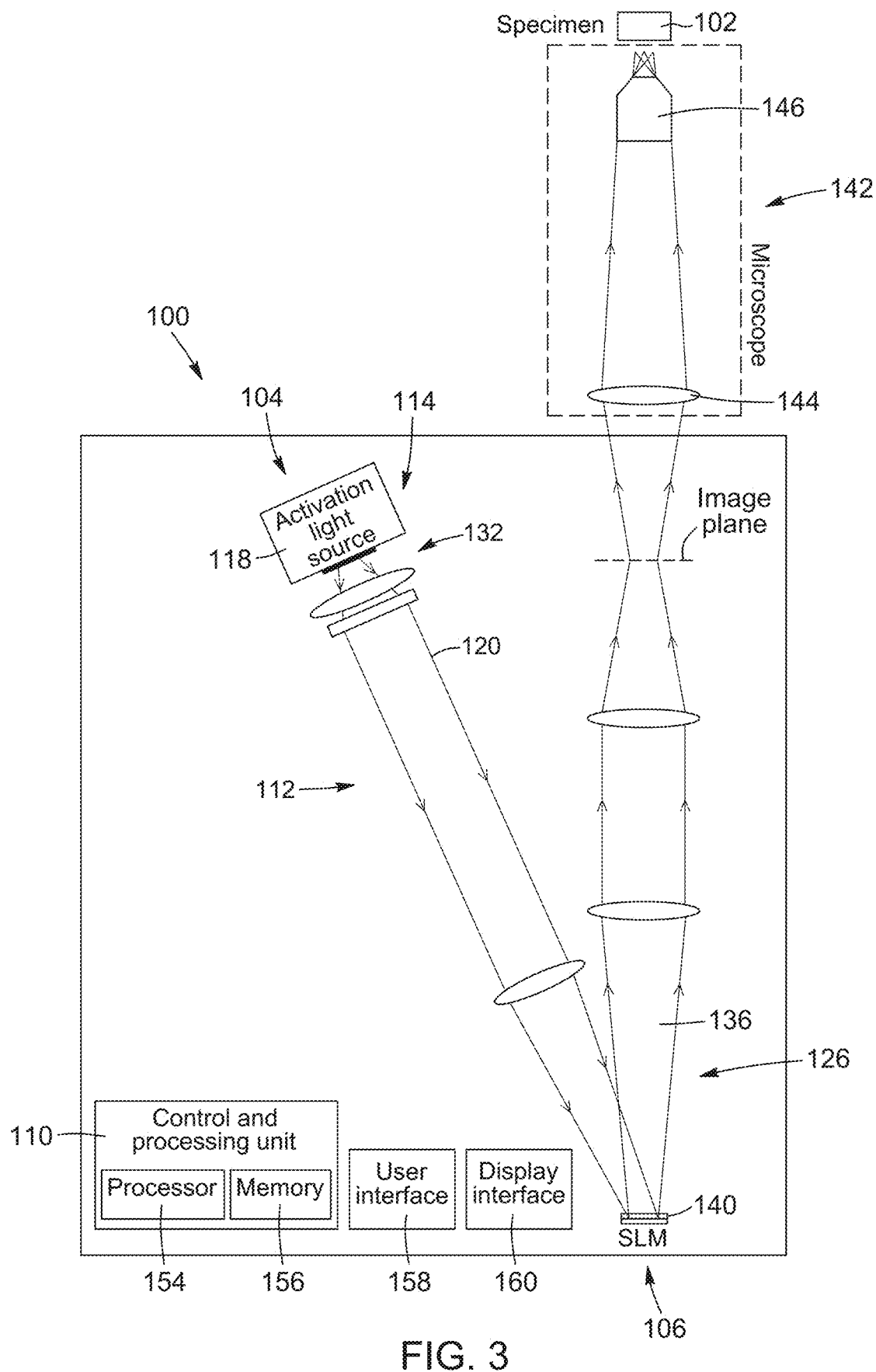
FIG. 3 is a schematic representation of an optogenetic system, in accordance with an embodiment.

Referring to FIG. 3, there is illustrated another possible embodiment of an optogenetic system 100 for probing a specimen 102. The optogenetic system 100 generally includes an illumination unit 104, an SLM unit 106, and a control and processing unit 110. The embodiment of FIG. 3 may share several features with the embodiment of FIG. 1, which need not be described again other than to highlight differences between them. Notably, the optogenetic system 100 of FIG. 3 includes no detection unit and its illumination unit 104 includes an activation unit 114 but no excitation unit. Thus, the optogenetic system 100 in FIG. 3 is intended for performing optogenetic activation without optogenetic excitation and detection.

The activation unit 114 is configured to generate activation light 120 to include a plurality of activation protocols temporally sampled and interleaved with one another according to a TDM scheme having a TDM sampling rate, each activation protocol being for activating optical actuators present in a respective one of a plurality of ROIs of the specimen 102, such as described above with reference to FIG. 2. The SLM unit 106 is configured to apply a spatio-temporal modulation to the activation light 120 to produce modulated activation light 136 and to direct the modulated activation light 136 onto the specimen 102. The spatio-temporal modulation includes repeatedly imparting, at a pattern switching rate, a sequence of a plurality of spatial modulation patterns to the plurality of temporally sampled and interleaved activation protocols, each spatial modulation pattern mapping to a respective one of the ROIs. Furthermore, the control and processing unit 110 is configured to match and synchronize the TDM sampling rate of the TDM scheme applied by the activation unit 114 with the pattern switching rate of the spatio-temporal modulation applied by the SLM unit 106. Implementing TDM-based activation protocols without associated excitation/detection protocols may be useful or advantageous in some applications, for example, in applications where optogenetic activation is performed in combination with electrophysiological monitoring.

Figure 4:
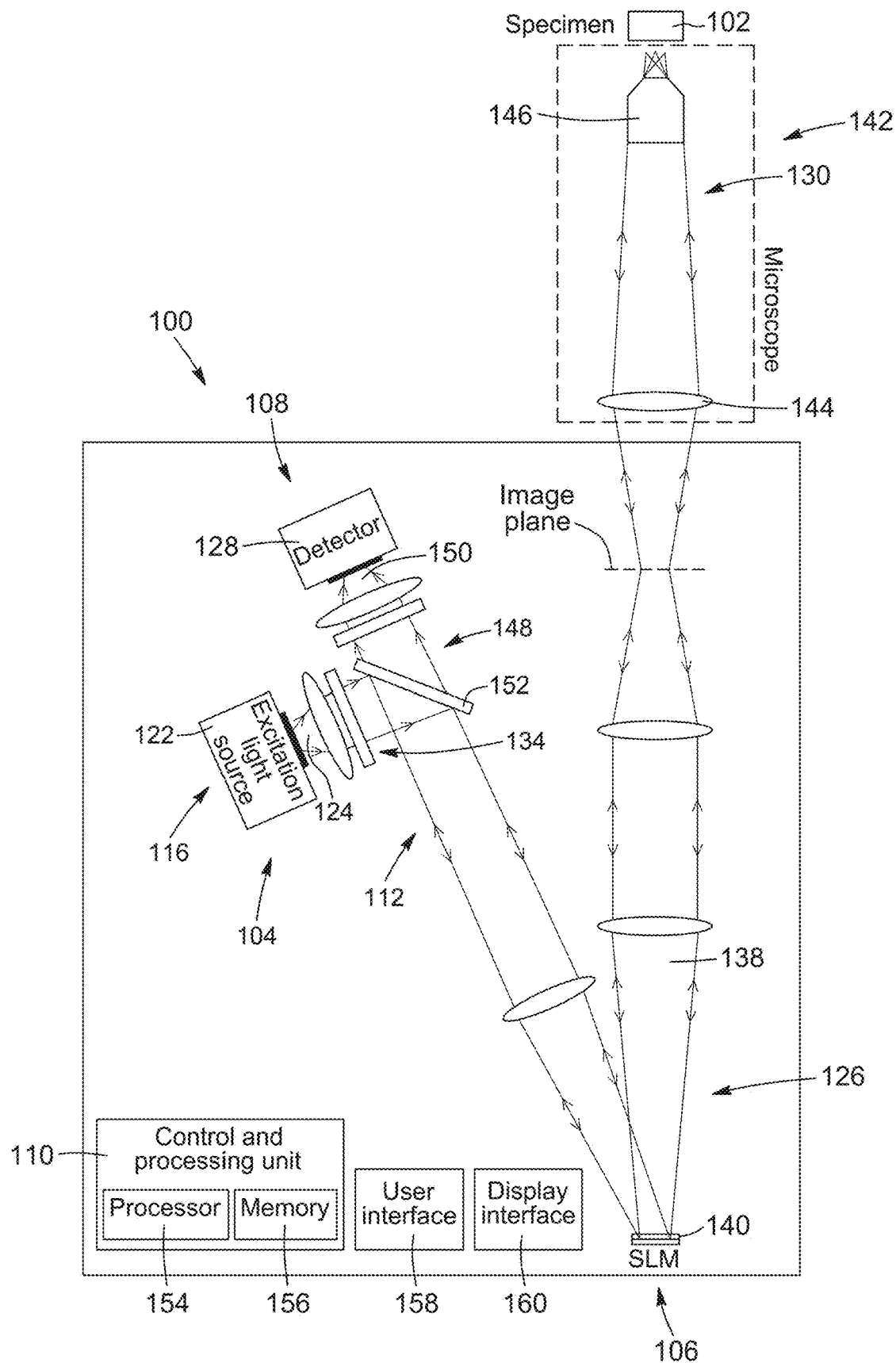
FIG. 4 is a schematic representation of an optogenetic system, in accordance with an embodiment.

Referring to FIG. 4, there is illustrated another possible embodiment of an optogenetic system 100 for probing a specimen 102. The optogenetic system 100 generally includes an illumination unit 104, an SLM unit 106, a detection unit 108, and a control and processing unit 110. The embodiment of FIG. 4 may share several features with the embodiment of FIG. 1, which need not be described again other than to highlight differences between them. Notably, in FIG. 4, the illumination unit 104 includes an excitation unit 116 but no activation unit. Thus, the optogenetic system 100 in FIG. 4 is intended for performing optogenetic excitation and detection without optogenetic activation.

The excitation unit 116 is configured to generate excitation light 124 to include a plurality of excitation protocols temporally sampled and interleaved with one another according to a TDM scheme having a TDM sampling rate, each excitation protocol being for exciting optical reporters present in a respective one of a plurality of ROIs of the specimen 102, such as described above with reference to FIG. 2. The SLM unit 106 is configured to apply a spatio-temporal modulation to the excitation light 124 to produce modulated excitation light 138 and to direct the modulated excitation light 138 onto the specimen 102. The spatio-temporal modulation includes repeatedly imparting, at a pattern switching rate, a sequence of a plurality of spatial modulation patterns to the plurality of temporally sampled and interleaved excitation protocols, each spatial modulation pattern mapping to a respective one of the ROIs. Furthermore, the control and processing unit 110 is configured to match and synchronize the TDM sampling rate of the TDM scheme applied by the excitation unit 116 with the pattern switching rate of the spatio-temporal modulation applied by the SLM unit 106. The SLM unit 106 is disposed in a path of specimen light 130 (e.g., fluorescence light) coming from optical reporters present in the plurality of ROIs in response to the plurality of excitation protocols. The SLM unit 106 is also configured to repeatedly impart, at the pattern switching rate, the sequence of the plurality of spatial modulation patterns to the specimen light 130 to produce modulated specimen light 150 for detection by the detection unit 108. The detection unit 108 is configured to detect the modulated specimen light 150 as a plurality of time-interleaved detection signals respectively associated with the plurality of ROIs. The control and processing unit 110 is configured to receive and perform a time-demultiplexing operation on the detected specimen light for deinterleaving the plurality of time-interleaved detection signals. Implementing TDM-based excitation protocols without associated activation protocols may be useful or advantageous in some applications, for example, in applications where a non-optical stimulation (e.g., a sensory stimulation in a live specimen or an electrical stimulation) is applied to a specimen in combination with fluorescence excitation and detection.

Figure 5:
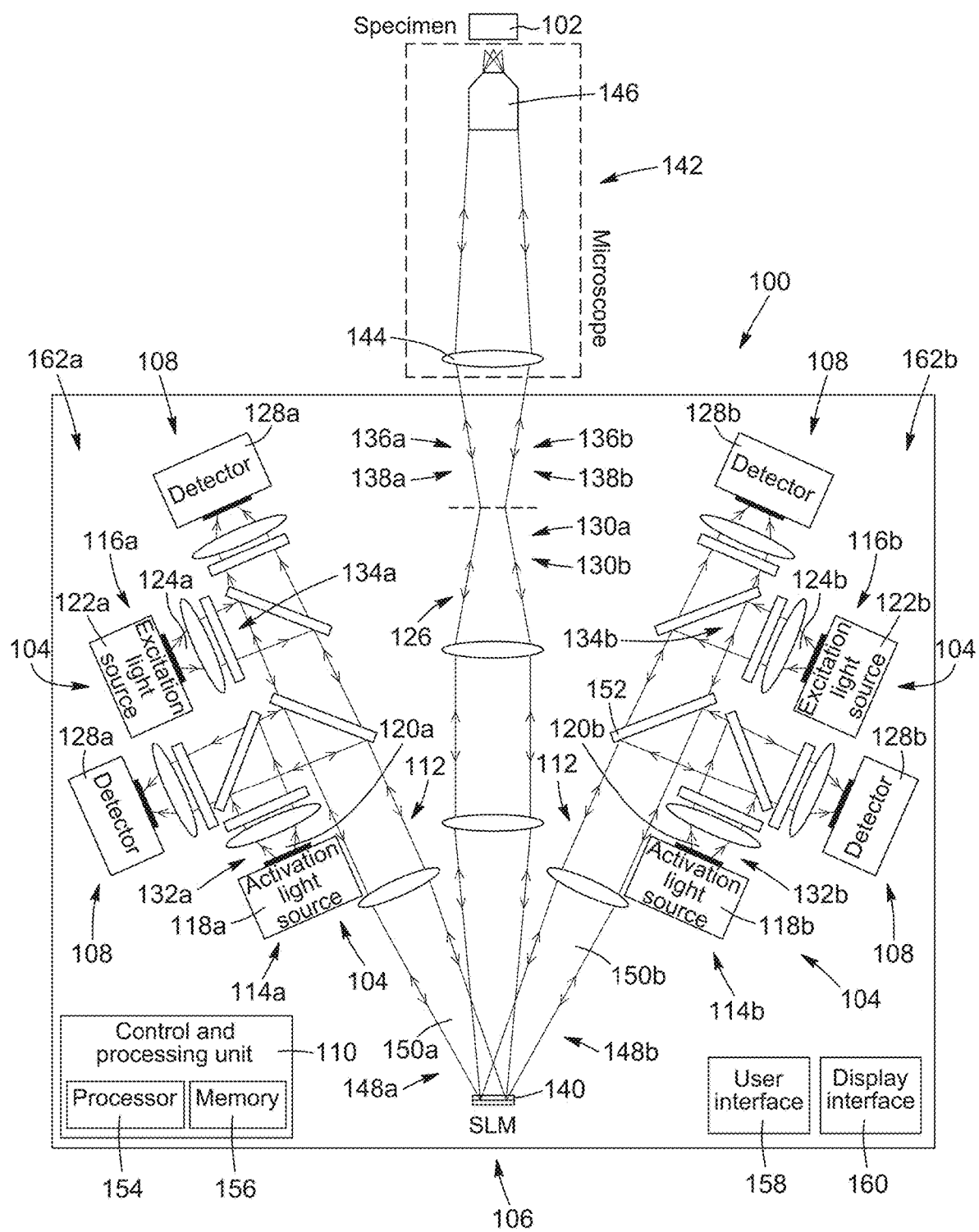
FIG. 5 is a schematic representation of an optogenetic system, in accordance with another possible embodiment.

Referring to FIG. 5, there is illustrated another embodiment of an optogenetic system 100 for probing a specimen 102. The optogenetic system 100 generally includes an illumination unit 104 with a pair of activation units 114a, 114b and a pair of excitation units 116a, 116b; an SLM unit 106; a detection unit 108 including two pairs of detectors 128a 128b; and a control and processing unit 110. The optogenetic system 100 of FIG. 5 has a dual-arm configuration including a first arm 162a and a second arm 162b. The first arm 162a and the second arm 162b are provided in a mirror-like arrangement with respect to a mirror axis parallel to the surface normal of the SLM unit 106. As in FIG. 1, the SLM unit 106 includes an SLM 140 embodied by a DMD.

Each arm 162a, 162b generally includes an activation unit 114a, 114b having an activation light source 118a, 118b configured to generate activation light 120a, 120b along an activation light path 132a, 132b; an excitation unit 116a, 116b having an excitation light source 122a, 122b configured to generate excitation light 124a, 124b along an excitation light path 134a, 134b to excite specimen light 130a, 130b from the specimen 102 (e.g. fluorescence light); and a detection unit 108 having two detectors 128a, 128b configured to detect spatially modulated specimen light 150a, 150b emanating from the specimen 102 along a detection light path 148a, 148b intercepting the SLM unit 106. Furthermore, the optogenetic system 100 is optically coupled to the specimen 102 via an optical assembly 142 including a tube lens 144 and an objective 146. The embodiment of FIG. 5 may share several features with the embodiment of FIG. 1, notably in terms of the construction and operation of the activation units 114a, 114b, the excitation units 116a, 116b, the SLM unit 106, and the detection unit 108. In particular, the embodiment of FIG. 5 can apply spatio-temporally modulated illumination protocols according to a TDM scheme, as described above. These features will not be described in detail again other than to highlight differences between them.

As noted above, in the embodiment of FIG. 1, light can be delivered to and collected from the specimen 102 only via the activated portion of the DMD, corresponding to the micromirrors which, at any given in time, are in their "on" state. In contrast, the embodiment of FIG. 5, due to its mirror-symmetrical, dual-arm configuration, can allow for the entire DMD to be used at once for delivering light to and collecting light from the specimen 102. This is because, at any given time, the activated portion of the DMD for light traveling in the first arm 162a corresponds to the deactivated portion of the DMD for light traveling in the second arm 162b, and vice versa. Thus, at any given time, the spatial modulation pattern imparted by the DMD to light traveling along the first arm 162a is complementary to the spatial modulation pattern imparted by the DMD to light traveling along the second arm 162b. As can be appreciated, the embodiment of FIG. 5 provides a flexible arrangement of pairs of activation, excitation, and detection paths, which may be used to implement time-interleaved activation, excitation, and detection protocols having different spatio-temporal illumination and detection patterns.

For example, in one possible scenario, the first activation light source 118a may be used to generated activation light 120a for activating optogenetic actuators located in one or more ROIs of the specimen 102 (e.g., according to a TDM-based activation scheme), while the second activation light source 118b is inactive. Each ROI may be defined by the set of micromirrors of the DMD that are in their "on"

state for light traveling in the first arm 162a. At the same time, the first excitation light source 122a and the second excitation light source 122b may be used to excite optogenetic reporters present in the specimen 102, together spanning the entire field of view of the specimen 102. The first pair of detectors 128a may be used to detect modulated specimen light 150a (e.g., fluorescence emission from optogenetic reporters excited by the first excitation light 124a) originating from the one or more ROIs activated by the activation light 120. The second pair of detectors 128b may be used to detect modulated specimen light 150b (e.g., fluorescence emission from the optogenetic reporters excited by the second excitation light 124b) originating from outside the one or more ROIs.

In another possible scenario, the first excitation light source 122a may be used to excite optogenetic reporters in one or more ROIs of the specimen 102, while the second excitation light source 122b may be inactive. Depending on the application, the first and second activation light sources 118a, 118b may be active or not. In this scenario, the first pair of detectors 128a and the second pair of detectors 128b are used to respectively detect first specimen light 150a and second specimen light 150b emanating from the specimen 102 and deflected by the SLM unit 106. The first specimen light 150a is formed by light originating from the specimen 102 and deflected onto the first pair of detectors 128a by the activated portion of the DMD (i.e., the set of micromirrors of the DMD that are in their "on" state for light traveling in the first arm 162a). Meanwhile, the second specimen light 150b is formed by light originating from the specimen 102 and deflected onto the second pair of detectors 128b by the deactivated portion of the DMD (i.e., the set of micromirrors of the DMD that are in their "off" state for light traveling in the first arm 162a, and thus in their "on" state for light traveling in the second arm 162b).

Figure 6:
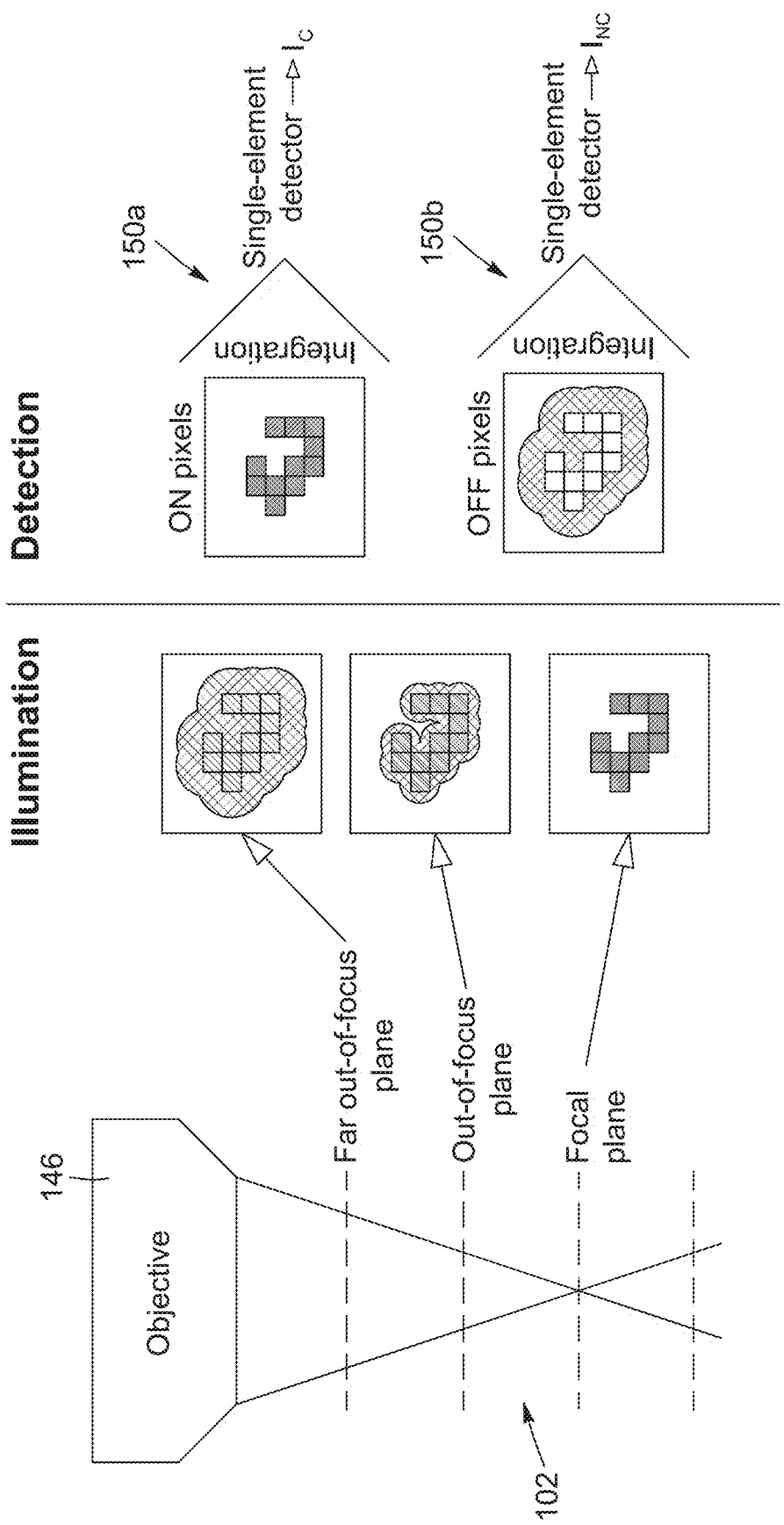
FIG. 6 illustrates how the embodiment of FIG. 5 may be used to distinguish out-of-focus background components from in-focus components of the detected specimen light.

Referring briefly to FIG. 6, the first specimen light 150a, 1c, is formed by in-focus patterned light originating from the object plane and by part of the out-of-focus background light originating from locations above and below the object plane. Meanwhile, the second specimen light 150b, $I_{NC}$, is formed by the remainder of the out-of-focus background light. By performing a weighted subtraction of the second detection signal $I_{NC}$ from the first detection signal $I_C$, a corrected detection signal representing the ROI of the specimen at the object plane may be obtained. Reference is made in this regard to the following two papers, the disclosures of which are incorporated herein by reference in their entirety: R. Heintzmann, et al., "A dual path programmable array microscope (PAM): Simultaneous acquisition of conjugate and non-conjugate images", Journal of Microscopy, vol. 204, part 2, pp. 119-137 (2001); and A. H. B. de Vries, et al., "Generation 3 programmable array microscope (PAM) for high speed large format optical sectioning in fluorescence". Proc. of SPIE, vol. 9376, 93760C (2015).

Figure 7:
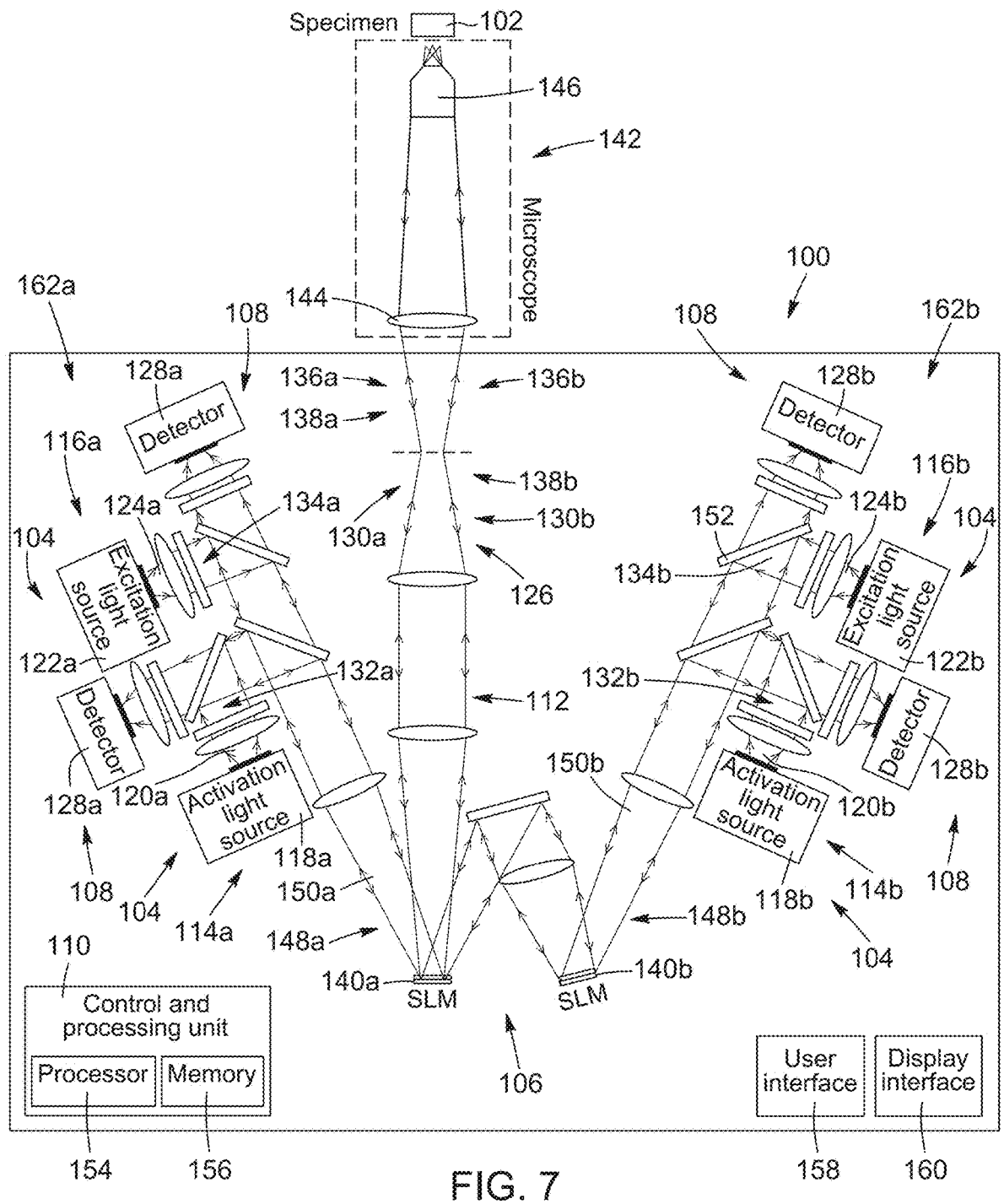
FIG. 7 is a schematic representation of an optogenetic system, in accordance with another possible embodiment.

Turning to FIG. 7, there is illustrated another possible embodiment of an optogenetic system 100 for probing a specimen 102. The optogenetic system 100 generally includes an illumination unit 104 with a pair of activation units 114a, 114b and a pair of excitation units 116a, 116b; an SLM unit 106 including a pair of SLMs 140a, 140b; a detection unit 108 including two pairs of detectors 128a, 128b; and a control and processing unit 110. As in the embodiment of FIG. 5, the optogenetic system 100 of FIG. 7 has a dual-arm configuration including a firm arm 162a and a second arm 162b. Each arm 162a, 162b generally includes an activation unit 114a, 114b having an activation light source 118a, 118b configured to generate activation light 120a, 120b along an activation light path 132a, 132b; an excitation unit 116a, 116b having an excitation light source 122a, 122b configured to generate excitation light 124a, 124b along an excitation light path 134a, 134b to excite specimen light 130a, 130b from the specimen (e.g. fluorescence light); and a detection unit 108 having two detectors 128a, 128b configured to detect spatially modulated specimen light 150a, 150b emanating from the specimen 102 along a detection light path 148a, 148b. Furthermore, the optogenetic system 100 is optically coupled to the specimen 102 via an optical assembly 142 including a tube lens 144 and an objective 146. The embodiment of FIG. 7 may share several features with the embodiment of FIG. 1, notably in terms of the construction and operation of the activation units 114a, 114b, the excitation units 116a, 116b, the SLM unit 106, and the detection unit 108. In particular, the embodiment of FIG. 7 can apply spatio-temporally modulated illumination protocols according to a TDM scheme, as described above. These features will not be described in detail again other than to highlight differences between them.

In contrast to the embodiment of FIG. 5, the SLM unit 106 in the embodiment of FIG. 7 includes two SLMs 140a, 140b, embodied as two optically conjugate DMDs. The first SLM 140a may be used similarly to the SLM 140 in FIG. 5. That is, at any given time, the activated portion of the first SLM 140a for light traveling in the first arm 162a corresponds to the deactivated portion for light in the second arm 162b, and vice versa. However, because of the provision of the second SLM 140b in the second arm 162b, the first arm 162a and the second arm 162b may be used to activate, excite, and observe two different ROIs or sets of ROIs of the specimen 102 that may, but need not, be complementary of each other. That is, the two different ROIs or sets of ROIs need not together span the entire field of view of the specimen 102. The embodiment of FIG. 7 can therefore be used to probe (e.g., activate and/or excite and/or detect) two distinct and spatially resolved sets of ROIs (e.g., small-sized ROIs) of the specimen 102 simultaneously, for example, using TDM-based activation and/or excitation schemes.

Figure 8:
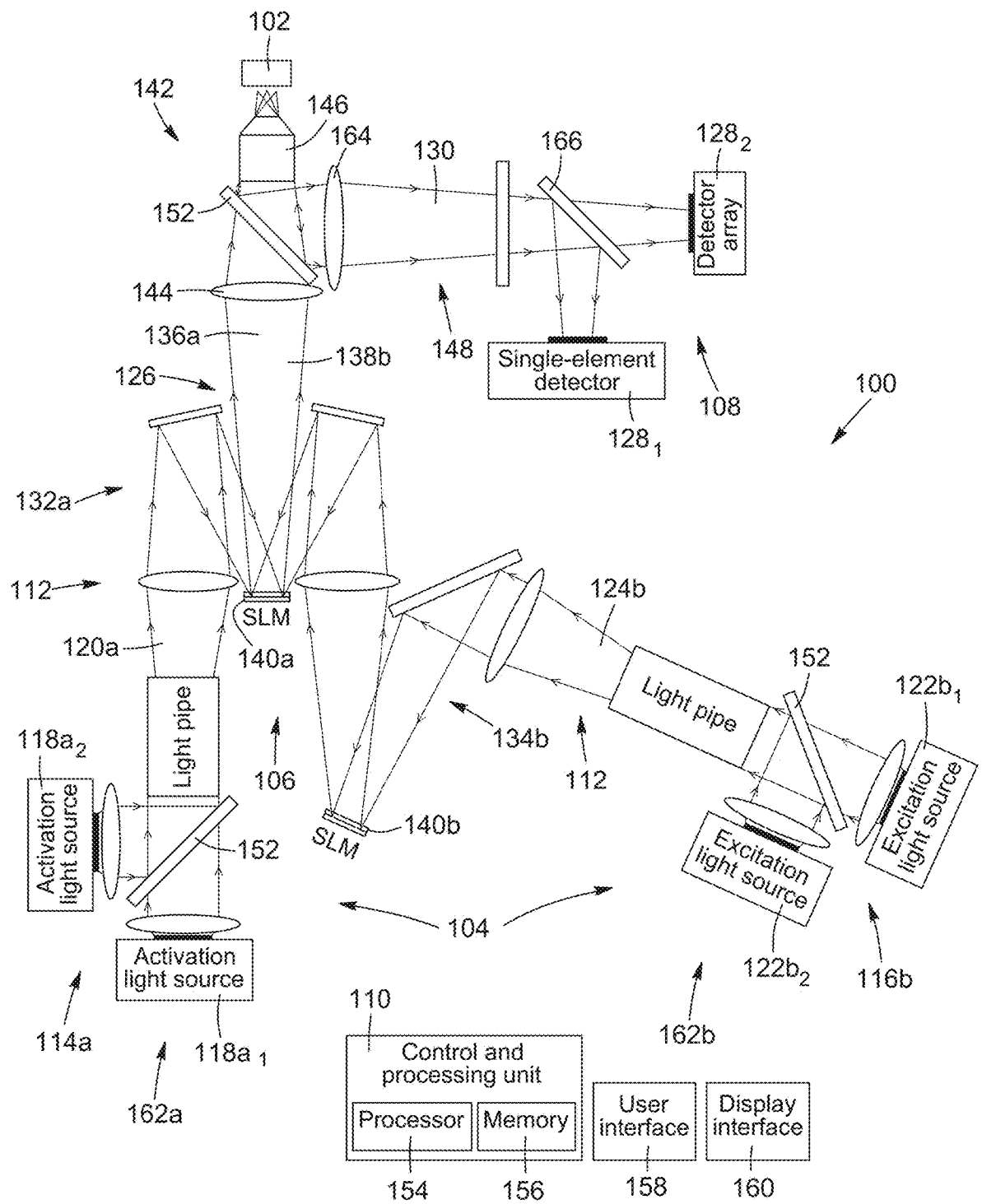
FIG. 8 is a schematic representation of an optogenetic system, in accordance with another possible embodiment.

Referring to FIG. 8, there is illustrated another possible embodiment of an optogenetic system 100 for probing a specimen 102. The optogenetic system 100 generally includes an illumination unit 104 with an activation unit 114a and an excitation unit 116b; an SLM unit 106; detection unit 108; and a control and processing unit 110. The embodiment of FIG. 8 may share several features with the embodiment of FIG. 1, notably in terms of the construction and operation of the illumination unit 104, the SLM unit 106, and the detection unit 108. In particular, the embodiment of FIG. 8 can apply spatio-temporally modulated illumination protocols according to a TDM scheme, as described above. The embodiment of FIG. 8 may also share several features with the embodiment of FIG. 7, notably in terms of the provision of two arms 162a, 162b and the construction and operation of the two SLMs 140a, 140b. These features will not be described in detail again other than to highlight differences between them.

A first difference between the embodiments of FIGS. 7 and 8 is that each arm 162a, 162b in FIG. 7 includes both an activation unit 114a, 114b and an excitation unit 116a, 116b, whereas in the embodiment of FIG. 8, the first arm 162a includes an activation unit 114a having two activation light sources $118a_1$, $118a_2$ but no excitation unit, while the second arm 162b includes an excitation unit 116b having two excitation light sources $122b_1$, $122b_2$, but no activation unit. That is, in FIG. 8, activation occurs along the first arm 162a, while excitation occurs along the second arm 162b. Thus, given the construction and operation of the two SLMs 140a, 140b described above with respect to FIG. 7, the embodiment of FIG. 8 allows for activating a first, spatially resolved ROI with the activation unit 114a, while simultaneously exciting a second, spatially resolved ROI with the excitation unit 116b, with independent TDM-based schemes.

A second difference between the embodiments of FIGS. 7 and 8 is in the configuration of the detection light path 148, which in FIG. 8 does not intercept any of the SLMs 140a, 140b. That is, in FIG. 8, the SLMs 140a, 140b are used to provide structured illumination for the activation light 120a and the excitation light 124b, but not structured detection. The detection unit 108 in FIG. 8 includes two detectors $128_1$, $128_2$: a single-element detector $128_1$ (e.g., a PMT) and an image capture device having an detector array $128_2$ (e.g., a CCD or a CMOS camera), which respectively lacks and enables spatial discrimination. The specimen light 130 (e.g., fluorescence light) may be separated from the modulated activation light 136a and the modulated excitation light 138b using a dichroic mirror 152 disposed between the objective 146 and the tube lens 144. The extracted specimen light 130 passes through another tube lens 164 and reaches a movable mirror 166 (e.g., a galvanometric mirror) or another optical element for selectively directing the specimen light 130 onto either the single-element detector $128_1$ or the detector array $128_2$. In one possible operation mode, the detector array $128_2$ may be used to acquire an image of the specimen 102 at a relatively low acquisition rate (e.g., less than 60 images per second). The acquired image may be processed or analyzed (e.g., by a human and/or a computer) to identify therein ROIs containing optogenetic actuators, optogenetic reporters, or other features of interest. Then, the single-element detector $128_1$ may be used to acquire, at a higher acquisition rate (e.g., up to the gigahertz range) specimen light 130 from the identified ROIs upon activation and excitation by the activation unit 114a and the excitation unit 116b, respectively. It is noted that the probing of the identified ROIs can be performed using a TDM scheme such as described above.

Referring to FIGS. 9A to 9C, different activation/excitation and detection scenarios that may be implemented with the embodiment of FIG. 8 will be discussed.

In FIG. 9A, all the micromirrors of the first SLM 140a are "off" for light traveling in the first arm 162a (and thus "on" for light traveling in the second arm 162b), while all the micromirrors of the second SLM 140b are "on". As a result, the entire field of view of the specimen 102 can be illuminated by excitation light 124b emitted by the excitation unit 116b (FIG. 9A, leftmost image, light gray background), without activation from the activation unit 114a. In response to this wide-field excitation, genetically encoded optogenetic reporters located in the field of view of the specimen 102 are excited to emit fluorescence light (FIG. 9A, second image from the left, black regions). The fluorescence response from the entire field of view of the specimen 102 may be detected in a wide-field acquisition scheme using either a relatively slow, detector array, such as a CCD or a CMOS camera (FIG. 9A, third image from the left, black regions), or a relatively fast, single-element detector, such as a PMT or an APD (FIG. 9A, rightmost image, depicting a spatially integrated specimen response that is more or less constant as a function of time, as can be expected from the application of a spatio-temporally uniform excitation without activation).

In FIG. 9B, a subset of the micromirrors of the first SLM 140a are "on" for light traveling in the first arm 162a, while all the micromirrors of the second SLM 140b are "on". As a result, an ROI 168a (e.g., a neuron) of the specimen 102, which corresponds to the subset of "on" micromirrors of the first SLM 140a, is illuminated by activation light 120a emitted by the activation unit 114a to activate genetically encoded optogenetic actuators located in the ROI 168a (FIG. 9B, leftmost image, darker gray region). At the same time, the remainder of the field of view of the specimen 102 (i.e., the entire field of view of the specimen 102, except for the activated ROI 168a) is illuminated by excitation light 124b emitted by the excitation unit 116b (FIG. 9B, leftmost image, lighter gray background). In response, optogenetic reporters in the field of view are excited to emit fluorescence light, except those in the ROI 168a, which are not illuminated by the excitation light 124b (FIG. 9B, second image from the left, black regions). The fluorescence response from the entire field of view of the specimen 102 may be detected in a wide-field acquisition scheme using either the detector array (FIG. 9B, third image from the left, black regions) or the single-element detector (FIG. 9B, rightmost image, depicting peaks at three different times, with the vertical bar depicting the time and duration of the activation protocol). As can be appreciated, the effect of activating optogenetic actuators present in the ROI 168a on the temporal dependence of the fluorescence emission from optogenetic reporters is captured by the single-element detector, but not by the detector array. As can also be appreciated, due to the wide-field detection performed by the single-element detector, the specific locations (i.e., sites "1", "2", and "3" in FIG. 9B, third image from the left) in the specimen 102 of the optogenetic reporters associated with each peak observed in its time-based response (peaks "1", "2", and "3" in FIG. 9B, rightmost image) cannot be ascertained by the image acquired by the detector array.

In FIG. 9C, a subset of the micromirrors of the first SLM 140a are "on" for light traveling in the first arm 162a, and a subset of the micromirrors of the second SLM 140b are "on". As a result, a first ROI 168a (e.g., a neuron) of the specimen 102, which corresponds to the subset of "on" micromirrors of the first SLM 140a, is illuminated by activation light 120a emitted by the activation unit 114a to activate optogenetic actuators located in the ROI 168a (FIG. 9C, leftmost image, darker gray region). At the same time, a second ROI 168b (e.g., another neuron) of the specimen 102, which corresponds to the subset of "on" micromirrors of the second SLM 140b, is illuminated by excitation light 124b emitted by the excitation unit 116b (FIG. 9C, leftmost image, lighter gray region). In response, only optogenetic reporters located in the second ROI 168b are excited to emit fluorescence light (FIG. 9C, second image from the left, black region). The fluorescence response from the second ROI 168b can be detected in a wide-field acquisition scheme using either the detector array (FIG. 9C, third image from the left, black region) or the single-element detector (FIG. 9C, rightmost image, depicting a peak at a certain time after the activation protocol has ended, with the vertical bar depicting the time and duration of the activation protocol). As can be appreciated, the effect of the activation of the optogenetic actuators present in the first ROI 168a on the temporal dependence of the fluorescence emission from the optogenetic reporters is captured by the single-element detector, but not by the detector array. Furthermore, due to the spatially resolved nature of the fluorescence excitation provided by the two SLMs 140a, 140b, the location (i.e., site "2" in FIG. 9C, third image from the left) in the specimen 102 of the optogenetic reporters associated with the peak observed in time-based response of the single-element detector (peak "2" in FIG. 9C, rightmost image) can be determined to correspond to the second ROI 168b.

In accordance with another aspect, there is provided a method for optogenetic activation and monitoring of a specimen. The method may be implemented using an optogenetic system such as those illustrated in FIGS. 1, 3, 4, 5, 7, and 8, or another suitable optogenetic system.

The method may include a step of generating illumination light. The illumination light may include a plurality of illumination protocols temporally sampled and interleaved with one another at TMD sampling rate, where each illumination protocol is for illuminating a respective ROI of a plurality of ROIs of the specimen. The method may also include a step of applying a spatio-temporal modulation to the illumination light to produce modulated illumination light and directing the modulated illumination light onto the specimen. The spatio-temporal modulation may include repeatedly imparting, at a pattern switching rate matched and synchronized with the TDM sampling rate, a sequence of a plurality of spatial modulation patterns to the plurality of temporally sampled and interleaved illumination protocols, where each spatial modulation pattern mapping to a respective one of the ROIs.

In some embodiments, the plurality of illumination protocols is a plurality of activation protocols for activating optical actuators present in the plurality of ROIs, respectively.

In other embodiments, the plurality of illumination protocols is a plurality of excitation protocols for exciting optical reporters present in the plurality of ROIs, respectively. In such embodiments, the method may further include steps of detecting specimen light, for example, fluorescence light, coming from the optical reporters present in the plurality of ROIs in response to the plurality of excitation protocols, and generating, from the detected specimen light, detection signal data conveying information about the specimen.

In some variants, detecting the specimen light may include detecting a plurality of time-interleaved detection signals respectively associated with the plurality of ROIs, and generating the detection signal data may include performing a time-demultiplexing operation on the detected specimen light for deinterleaving the plurality of time-interleaved detection signals. In some variants, the method may further include repeatedly imparting, at the pattern switching rate, the sequence of the plurality of spatial modulation patterns to the specimen light prior to detecting the specimen light.

In some embodiments, in addition to generating the plurality of illumination protocols as a plurality of excitation protocols, the step of generating the illumination light may further include generating a plurality of activation protocols temporally sampled and interleaved with one another at the TDM sampling rate, the plurality of activation protocols being for activating optical actuators present in the plurality of ROIs. In such embodiments, the step of applying the spatio-temporal modulation to the illumination light further may further include repeatedly imparting, at the pattern switching rate, the sequence of the plurality of spatial modulation patterns to the plurality of temporally sampled and interleaved activation protocols.

In other embodiments, in addition to generating the plurality of illumination protocols as a plurality of excitation protocols, the step of generating the illumination light may further include generating a plurality of activation protocols temporally sampled and interleaved with one another at the TDM sampling rate, the plurality of activation protocols being for activating optical actuators present in another plurality of ROIs of the specimen, different from the plurality of ROIs associated with the plurality of excitation protocols. In such embodiments, the step of applying the spatio-temporal modulation to the illumination light may further include repeatedly imparting, at the pattern switching rate, a sequence of another plurality of spatial modulation patterns to the plurality of temporally sampled and interleaved activation protocols, where each one of the other spatial modulation patterns maps to a respective one of the other ROIs.

In accordance with another aspect of the present description, there is provided a non-transitory computer readable storage medium having stored thereon computer executable instructions that, when executed by a processor, cause the processor to perform various steps of a method of controlling an optogenetic system such as described herein.

In accordance with another aspect of the present description, there is provided a computer device for use with an optogenetic system such as described herein, the computer device including a processor and a non-transitory computer readable storage medium operatively coupled to the processor and having stored thereon computer readable instructions that, when executed by a processor, cause the processor to perform various steps for controlling the optogenetic system.

Of course, numerous modifications could be made to the embodiments described above without departing from the scope of the appended claims.

The invention claimed is:

1. An optogenetic method for probing a specimen, comprising:
    generating illumination light, the illumination light comprising a plurality of illumination protocols temporally sampled and interleaved with one another at a time-division-multiplexed (TDM) sampling rate, each illumination protocol being for illuminating a respective region of interest (ROI) of a plurality of ROIs of the specimen;
    applying a spatio-temporal modulation to the illumination light to produce modulated illumination light and directing the modulated illumination light onto the specimen, the spatio-temporal modulation comprising repeatedly imparting, at a pattern switching rate matched and synchronized with the TDM sampling rate, a sequence of a plurality of spatial modulation patterns to the plurality of temporally sampled and interleaved illumination protocols, each spatial modulation pattern mapping to a respective one of the ROIs;
    repeatedly imparting, at the pattern switching rate, the sequence of the plurality of spatial modulation patterns to specimen light emanating from the specimen, to produce modulated specimen light;
    detecting the modulated specimen light; and
    generating, from the detected modulated specimen light, detection signal data conveying information about the specimen.

2. The optogenetic method of claim 1, wherein the plurality of illumination protocols is a plurality of activation protocols for activating optical actuators present in the plurality of ROIs, respectively.

3. The optogenetic method of claim 1, wherein the plurality of illumination protocols is a plurality of excitation protocols for exciting optical reporters present in the plurality of ROIs, respectively, and wherein, in response to the plurality of excitation protocols, the optical reporters emit reporter light that forms at least part of the specimen light.

4. The optogenetic method of claim 3, wherein the reporter light comprises fluorescence light.

5. The optogenetic method of claim 3, wherein:
generating the illumination light further comprises generating a plurality of activation protocols temporally sampled and interleaved with one another at the TDM sampling rate, the plurality of activation protocols being for activating optical actuators present in the plurality of ROIs; and
applying the spatio-temporal modulation to the illumination light further comprises repeatedly imparting, at the pattern switching rate, the sequence of the plurality of spatial modulation patterns to the plurality of temporally sampled and interleaved activation protocols.

6. The optogenetic method of claim 3, wherein:
generating the illumination light further comprises generating a plurality of activation protocols temporally sampled and interleaved with one another at the TDM sampling rate, the plurality of activation protocols being for activating optical actuators present in another plurality of ROIs of the specimen; and
applying the spatio-temporal modulation to the illumination light further comprises repeatedly imparting, at the pattern switching rate, a sequence of another plurality of spatial modulation patterns to the plurality of temporally sampled and interleaved activation protocols, each one of the other spatial modulation patterns mapping to a respective one of the other ROIs.

7. The optogenetic method of claim 1, wherein:
detecting the modulated specimen light comprises detecting a plurality of time-interleaved detection signals respectively associated with the plurality of ROIs; and
generating the detection signal data comprises performing a time-demultiplexing operation on the detected modulated specimen light for deinterleaving the plurality of time-interleaved detection signals.

8. The optogenetic method of claim 1, wherein the spatio-temporal modulation is applied using one or more digital micromirror devices (DMDs).

9. The optogenetic method of claim 1, wherein the TDM sampling rate and the pattern switching rate range from about 1 kHz to about 40 kHz.

10. An optogenetic system for probing a specimen, comprising:
an illumination unit configured to generate illumination light comprising a plurality of illumination protocols temporally sampled and interleaved with one another according to a time-division-multiplexed (TDM) scheme having a TDM sampling rate, each illumination protocol being for illuminating a respective region of interest (ROI) of a plurality of ROIs of the specimen;
a spatial light modulator (SLM) unit configured to apply a spatio-temporal modulation to the illumination light to produce modulated illumination light and to direct the modulated illumination light onto the specimen, the spatio-temporal modulation comprising repeatedly imparting, at a pattern switching rate, a sequence of a plurality of spatial modulation patterns to the plurality of temporally sampled and interleaved illumination protocols, each spatial modulation pattern mapping to a respective one of the ROIs, the SLM unit being disposed in a path of specimen light emanating from the specimen, the SLM unit being further configured to repeatedly impart, at the pattern switching rate, the sequence of the plurality of spatial modulation patterns to the specimen light to produce modulated specimen light;
a detection unit configured to detect the modulated specimen light and generate detection signal data conveying information about the specimen; and
a control and processing unit operatively coupled to the illumination unit, the SLM unit, and the detection unit, the control and processing unit being configured to match and synchronize the TDM sampling rate of the TDM scheme applied by the illumination unit with the pattern switching rate of the spatio-temporal modulation applied by the SLM unit.

11. The optogenetic system of claim 10, wherein the illumination unit comprises an activation unit comprising at least one activation light source configured to generate, as the plurality of illumination protocols, a plurality of activation protocols for activating optical actuators present in the plurality of ROIs, respectively.

12. The optogenetic system of claim 10, wherein the illumination unit comprises an excitation unit comprising at least one excitation light source configured to generate, as the plurality of illumination protocols, a plurality of excitation protocols for exciting optical reporters present in the plurality of ROIs, respectively, wherein, in response to the plurality of excitation protocols, the optical reporters emit reporter light that forms at least part of the specimen light.

13. The optogenetic system of claim 12, wherein the reporter light comprises fluorescence light.

14. The optogenetic system of claim 12, wherein:
the illumination unit further comprises an activation unit comprising at least one activation light source configured to generate a plurality of activation protocols temporally sampled and interleaved with one another at the TDM sampling rate, the plurality of activation protocols being for activating optical actuators present in the plurality of ROIs; and
the SLM unit is configured to repeatedly impart, at the pattern switching rate, the sequence of the plurality of spatial modulation patterns to the plurality of temporally sampled and interleaved activation protocols.

15. The optogenetic system of claim 12, wherein:
the illumination unit further comprises an activation unit comprising at least one activation light source configured to generate a plurality of activation protocols temporally sampled and interleaved with one another at the TDM sampling rate, the plurality of activation protocols being for activating optical actuators present in another plurality of ROIs of the specimen; and
the SLM unit is configured to repeatedly impart, at the pattern switching rate, a sequence of another plurality of spatial modulation patterns to the plurality of temporally sampled and interleaved activation protocols, each one of the other spatial modulation patterns mapping to a respective one of the other ROIs.

16. The optogenetic system of claim 10, wherein the detection unit comprises a single-element detector configured to detect the modulated specimen light in a time-resolved manner.

17. The optogenetic system of claim 10, wherein:
the detection unit is configured to detect the modulated specimen light as a plurality of time-interleaved detection signals respectively associated with the plurality of ROIs; and
the control and processing unit is configured to perform a time-demultiplexing operation on the detected modulated specimen light for deinterleaving the plurality of time-interleaved detection signals.

18. The optogenetic system of claim 10, wherein the SLM unit comprises one or more digital micromirror devices.

19. The optogenetic system of claim 10, wherein the detection unit comprises an array of detectors configured to acquire images from the modulated specimen light.

* * * * *